United States Patent [19]
Healy

[11] Patent Number: 5,506,986
[45] Date of Patent: Apr. 9, 1996

[54] MEDIA MANAGEMENT SYSTEM USING HISTORICAL DATA TO ACCESS DATA SETS FROM A PLURALITY OF DATA STORAGE DEVICES

[75] Inventor: Michael J. Healy, Flower Mound, Tex.

[73] Assignee: Electronic Data Systems Corporation, Plano, Tex.

[21] Appl. No.: 441,886

[22] Filed: May 16, 1995

Related U.S. Application Data

[63] Continuation of Ser. No. 913,283, Jul. 14, 1992, abandoned.

[51] Int. Cl.$^6$ .............................. G06F 13/00; G06F 12/00
[52] U.S. Cl. .................. 395/600; 395/848; 395/438; 395/480; 395/463; 395/487; 395/497.04; 395/439; 364/DIG. 1; 364/282.1; 364/246.3; 364/246.92
[58] Field of Search ........................... 395/600, 848, 395/438, 480, 463, 487, 497.04, 439; 364/DIG. 1

[56] References Cited

U.S. PATENT DOCUMENTS

| | | | |
|---|---|---|---|
| 4,099,235 | 7/1978 | Hoschler et al. | 364/200 |
| 4,310,883 | 1/1982 | Clifton et al. | 364/200 |
| 4,403,286 | 7/1983 | Fry et al. | 364/200 |
| 4,542,458 | 9/1985 | Kitajima et al. | 364/200 |
| 4,633,387 | 12/1986 | Hartung et al. | 364/200 |
| 4,636,946 | 1/1987 | Hartung et al. | 364/200 |
| 4,638,424 | 1/1987 | Beglin et al. | 364/200 |
| 4,680,703 | 7/1987 | Kriz | 364/200 |
| 4,703,422 | 10/1987 | Kinoshita et al. | 364/200 |
| 4,771,375 | 9/1988 | Beglin et al. | 364/200 |
| 4,905,171 | 2/1990 | Kiel et al. | 364/551 |
| 5,018,060 | 5/1991 | Gelb et al. | 364/200 |
| 5,131,087 | 7/1992 | Warr | 395/425 |
| 5,193,172 | 3/1993 | Arai et al. | 395/425 |
| 5,206,951 | 4/1993 | Khoyi et al. | 395/600 |
| 5,214,778 | 5/1993 | Glider et al. | 395/575 |
| 5,287,499 | 2/1994 | Nemes | 395/600 |
| 5,313,617 | 5/1994 | Nakano et al. | 395/500 |

Primary Examiner—Thomas G. Black
Assistant Examiner—Jean R. Homere
Attorney, Agent, or Firm—L. Joy Griebenow

[57] ABSTRACT

The media management system uses a rule based system to manage the media assignment function for a data processor. This apparatus comprises a set of software programs that communicate in real time with various standard software components on the data processor and also retrieves information describing data stored on the data storage devices themselves to compile information concerning data set activity. The media management system reviews data set size, off-site requirements for the data set, space available on DASD as well as other data set characteristics to dynamically select the most appropriate media type and specific device to store the data set. In addition, the media management system dynamically adjusts the data set management policy based upon detected patterns of customer usage of data sets and the size of the data sets that are stored on the peripheral devices in order to meet the customer's specified requirements for availability, accessibility, performance, location (local, remote), retention and security.

36 Claims, 16 Drawing Sheets

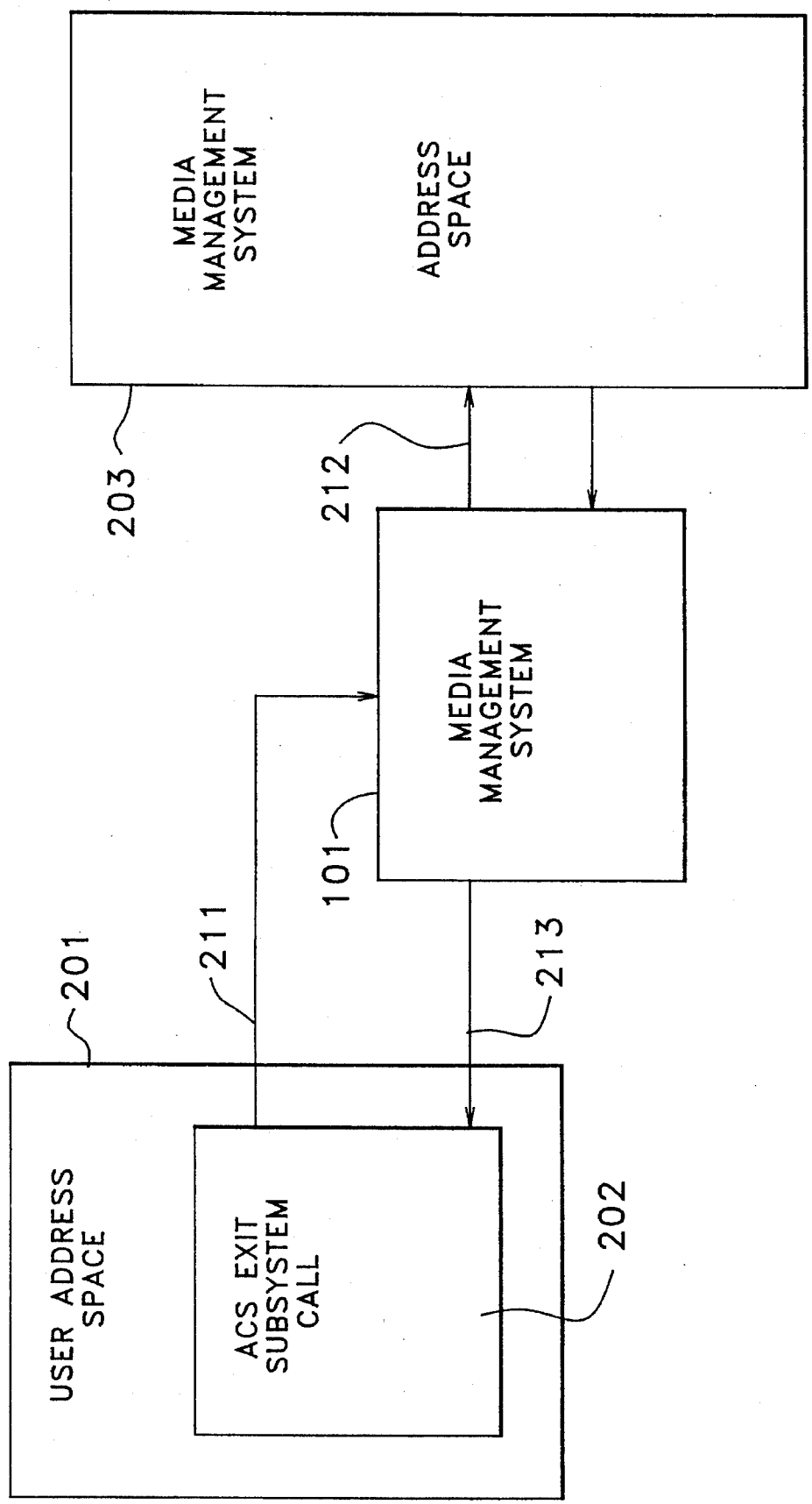

| MCK | MCDFLGS –MCDFL2 | MCDDLR | MCDSIZEB | MCDNMIG |
|---|---|---|---|---|
| 00 | 70 | 84 | 116 | 124 |

FIG.10.

FORMAT 1

| DS1DSNAM | DS1LSTAR | DS1EXT1 | DS1EXT2 | DS1EXT3 | DS1PTRDS |
|---|---|---|---|---|---|
| 00 | 98 | 105 | 115 | 125 | 135 |

FORMAT 3

| X'03030303' | DS3EXTNT | DS3ADEXT | DS3PTRDS |
|---|---|---|---|
| 00 | 04 | 45 | 135 |

FORMAT 3

| X'03030303' | DS3EXTNT | DS3ADEXT | DS3PTRDS |
|---|---|---|---|
| 00 | 04 | 45 | 135 |

| SCTDDNAM | SIOTVRSB | SCTSBYT4 –SIOTVAFF | SIOUBYT3 –SIO3TAPE | SCTSBYT3 –SIOTSMSM | SIOTNPTR |
|---|---|---|---|---|---|
| 04 | 36 | 59 | 62 | 83 | 152 |

FIG. 14.

SPACE REQUEST

| HSMSSBID | HSMSSBSP | HSMSSBDS | HSMSSBJB | HSMSSBDD | HSMSSBAC |
|---|---|---|---|---|---|
| 00 | 04 | 08 | 52 | 60 | 68 |

MIGRATION HISTORY REQUEST

| HSMSSBID | HSMS2ERO | HSMS2ERW | HSMS2RET |
|---|---|---|---|
| 00 | 04 | 08 | 12 |

FIG. 16.

| HSMSUNXT | HSMSUECB | HSMSUADR | HSMSUSTT |
|---|---|---|---|
| 00 | 04 | 08 | 12 |
| HSMSUST2 | HSMSUST3 | HSMSDSN | |
| 16 | 20 | 24 | |
| HSMSUJOB | HSMSUDDN | HSMSUACC | HSMSUSPC |
| 68 | 76 | 84 | 92 |
| HSMSSTIM | HSMSSDAT | HSMSSFLG | HSMSMIGR |
| 96 | 100 | 104 | 108 |

SSCVT

| HSMSFLG1 | HSMSFLG2 | HSMSSMFR | HSMSPTR |
|---|---|---|---|
| 20 | 21 | 23 | 28 |

| HSMSSPAC | HSMSMAXS | HSMSSGRP | |
|---|---|---|---|
| 00 | 04 | 08 | |
| HSMSMGMT | | HSMSDATA | |
| 18 | | 24 | |
| HSMSSTOR | | HSMSTIME | HSMSPCAT |
| 32 | | 40 | 44 |
| HSMSPHSM | HSMSPTLS | HSMSPSPC | |
| 48 | 52 | 56 | |

FIG.13.

GROUP TABLE

| GRPID | GRPADDR | | X'FFFFFF' |
|---|---|---|---|
| 00 | 03 | 07 | |

703

| CLASSNAM | | CLSMIGF | |
|---|---|---|---|
| 00 | | 30 | 31 |
| CLSPRDY | CLSL1DY | CLSCMAU | |
| 32 | 34 | 36 | 37 |

FIG.15.

MEDIA MANAGEMENT SYSTEM USING HISTORICAL DATA TO ACCESS DATA SETS FROM A PLURALITY OF DATA STORAGE DEVICES

This application is a continuation of application Ser. No. 07/913,283, filed Jul. 14, 1994, now abandoned.

FIELD OF THE INVENTION

This invention relates to data storage systems that make use of multiple classes of media, including both mountable media and fixed media, and in particular, to a method and apparatus for efficiently placing and managing data sets that are stored on this media.

PROBLEM

It is a problem in the field of data storage systems to optimize the placement of data sets on data storage devices. For large data processors, data storage devices can comprise a plurality of different types of media architected in a hierarchical data storage configuration. The data storage devices can include DASD devices connected to the data processor is an on-line manner to store the most frequently used data sets for immediate access by the data processor. In addition, a plurality of tape drives can be connected to the data processor to read and write data on mountable media, such as 3480-type form factor magnetic tape cartridges. The magnetic tape cartridges can be loaded into the associated tape drive via a human operator or by means of a robotic automated cartridge library system such as the 4400 Automated Cartridge System (ACS) manufactured by Storage Technology Corporation of Louisville, Colorado. Some data storage systems couple DASD devices with tape drives in a manner to automatically archive the least frequently used data stored on DASD devices onto mountable magnetic tape media.

A major difficulty with any data storage subsystem is the ability to perform dynamic selection of the appropriate storage media based on the needs of the user and the data processor to access the data, speed of data read/write performance and the retention requirements for a particular data set. This problem is further compounded by the introduction of new technology such as disk array technology, optical disk, optical tape, helical scan tape and other forms of data storage media which must be integrated into the repertoire of data storage devices connected to a data processor. Absent a coherent overall data set management philosophy, data sets are routinely staged to inappropriate media and magnetic tapes are typically underutilized, in that only a fraction of the data storage capacity is typically used to store data sets. Therefore, there presently is no media management system that directs data sets to the most appropriate data storage media in a data processor that uses multiple classes of data storage media.

SOLUTION

The above-described problems are solved and a technical advance achieved in the field by the media management system of the present invention that uses a rule based system to manage the media assignment function for a data processor. This apparatus comprises a set of software programs that communicate in real time with various standard software components on the data processor and also retrieves information describing data stored on the data storage devices themselves to compile information concerning data set activity. The media management system reviews data set size, off-site requirements for the data set, space available on DASD and other media as well as other data set characteristics to both dynamically select the most appropriate media type and to identify a specific data storage device to store the data set. The data processor then uses this information to write the data set on the identified data storage device. In addition, the media management system dynamically adjusts the data set management policy based upon detected patterns of customer usage of data sets and the size of the data sets that are stored on the peripheral devices in order to meet the customer's specified requirements for availability, accessibility, performance, location (local, remote), retention, and security.

The media management system resides on the data processor but is operationally independent of the standard data processor software. The media management system functions as an adjunct subroutine that passes data storage device information to the other processes on the data processor to direct the data set storage activity. In operation, the media management system intercepts data set creation commands in the data processor that are typically used to create a new data set and uses available data set activity information to dynamically determine the appropriate storage media for this data set.

For example, when the data set being created is a new tape generation data set, this data set is written to available space on a mountable magnetic tape in response to control commands from the data processor. The media management system intercepts the tape generation data set creation command which notes the generation number assigned to this particular generation data set. The generation data set prior to this one being created can provide the historical data set activity information needed to determine the most efficient storage media for this particular data set. The media management system uses the generation data set name to access system catalogs maintained by the data processor that denote the correspondence between a particular named data set and its location on a physical data storage device. This catalog information is accessed by the media management system to determine the present physical location of the previous generation data set as specified by the volume serial number (VOLSER) and the unit type of the present data storage device on which this previous generation data set is located. The media management system checks the unit type to determine if the data set presently resides on tape. If so, the data set control blocks for each volume identified in the catalog search are read in order to determine the size of the data set. This present size of the data set is compared to a predetermined limit to identify whether this data set is a candidate for relocation to DASD. In addition, the data class, storage class and management class assigned to this data set are reviewed to determine the most appropriate media on which this data set is to be stored. The data storage system can contain multiple levels within the data storage hierarchy: on-line DASD devices, magnetic tape managed by a robotic library, and magnetic tape managed by human operators. Additional data storage media can be used to provide further layers within this hierarchy to provide finer granularity in the management of the data sets contained therein. The characteristics of each of these levels of the data storage hierarchy are considered in making a determination of the most appropriate data storage location for this newly created data set. Once a determination is made by the media management system, the data set is assigned a data class, a storage class and a management class to indicate the most appropriate media on which this data set is to reside. The data processor is then provided with this information to enable the data processor to direct the data set to the selected data storage device that would most efficiently provide the user with access to this particular data set.

Each time a data set is created or retrieved from its data storage location, the media management system reviews the redirection history of the data set as well as its frequency of use, size and other relevant data set characteristics to dynamically determine the type of data storage media as well as the media management category that is presently most appropriate for this data set. Therefore, the apparatus of the present invention dynamically modulates the management of each data set stored within the hierarchical data storage system in order to optimize the data retrieval capability of the data storage system for the data processor.

BRIEF DESCRIPTION OF THE DRAWING

FIG. 2 illustrates in block diagram form details of the architecture of the media management system;

FIGS. 10–16 display different data formats for various data set management blocks.

DETAILED DESCRIPTION

Figure 1:
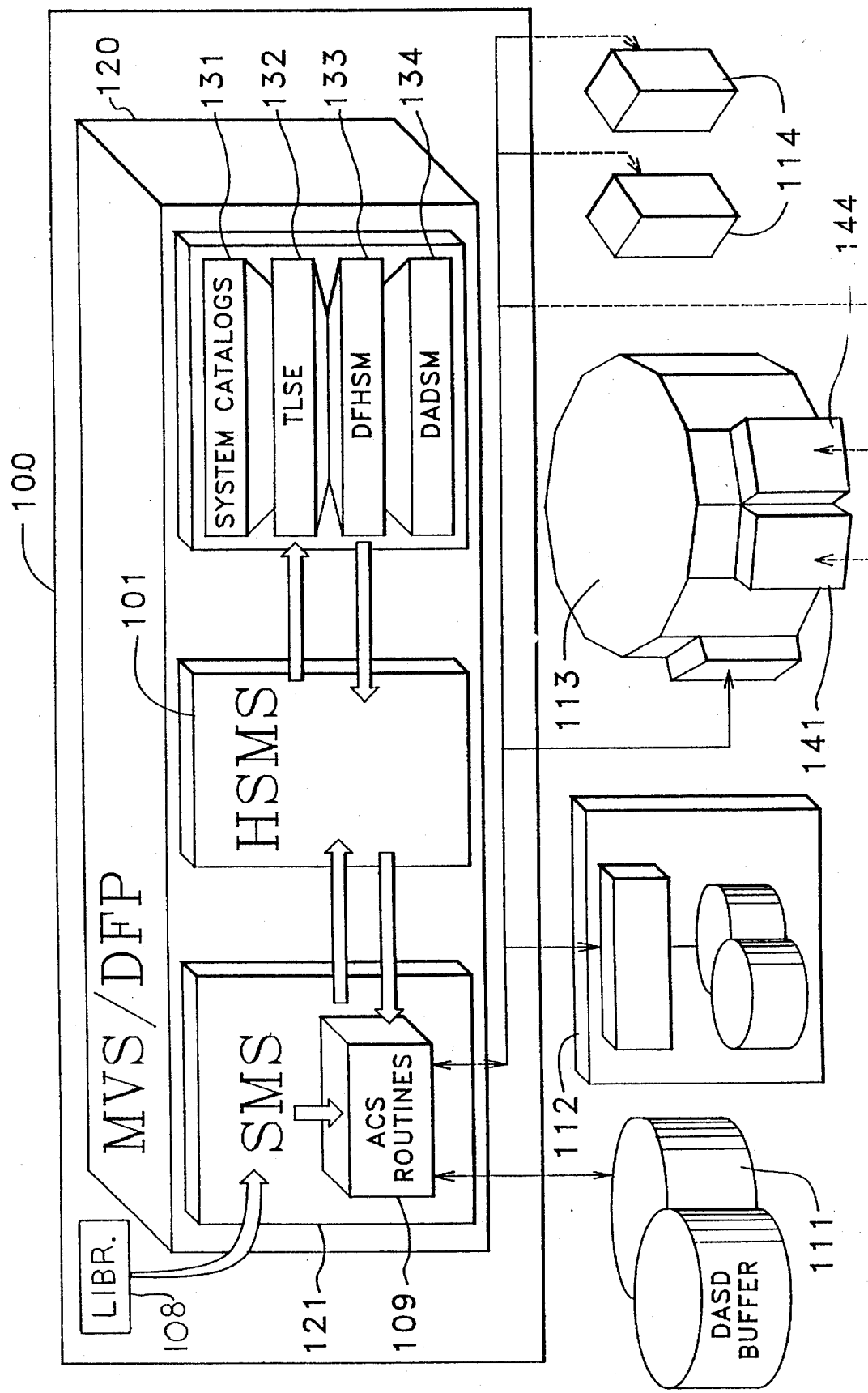
FIG. 1 illustrates in block diagram form the overall architecture of the hierarchical data storage system on which the media management system is implemented.

FIG. 1 illustrates in block diagram form the overall architecture of a data processing system that incorporates the media management system 101 of the present invention. The data processing system includes at least one data processor 100 to which is connected a data storage system that contains a plurality of classes of data storage devices 111–114 for reading and writing data onto data storage media for use by the data processor 100. The data storage devices are arranged in a hierarchical configuration consisting of a plurality of classes 111–114 of data storage devices, each of which has characteristics that distinguish it from the remaining ones of the classes.

In the embodiment illustrated in FIG. 1, the data processor 100 runs the IBM Multiple Virtual Systems (MVS) operating system and includes the Multiple Virtual Systems/Data Facility Product 120 (MVS/DFP). MVS/DFP is a set of programs used to manage programs, devices, and data in an MVS operating environment. Data processor 100 is connected to a plurality of DASD devices 111 as well as a plurality of magnetic tape drives 114 on which magnetic tape cartridges are manually loaded and unloaded by an operator. Data processor 100 is also connected to an automated cartridge library system 113 wherein a plurality of magnetic tape cartridges are robotically stored and retrieved therefrom for loading onto a plurality of magnetic tape drives 141–144 which are directly connected to the data processor 100 to read and write data on the magnetic tape cartridges. An alternative form of disk storage device, such as a disk array data storage subsystem 112 is also connected to data processor 100. It is evident that this plurality of data storage devices differs in data storage characteristics including speed of data retrieval, data capacity per unit of media as well as cost to the user. The storage of data sets on these data storage devices should be managed in a manner that the data management characteristics of the data sets are commensurate with the data storage characteristics of the data storage device on which the data set is stored. Therefore, the storage of infrequently used data sets on a DASD device or the storage of data sets of significant extent on a DASD device are examples of inefficient use of the expensive DASD device.

Automated Cartridge Library System

The automated cartridge library system 113 stores a plurality of data storage media cartridges, such as 18 track magnetic tape cartridges of the IBM 3480-type for use by data processor 100. The automated cartridge library system 113 contains a robot arm system that functions to retrieve the data storage media cartridges from media cartridge storage cells contained in the library module and load the retrieved data storage media cartridges on tape drives 141–144. A system of control elements control the robot arm mechanism to retrieve a designated magnetic tape cartridge and load it into a tape drive. In operation, a user connected to data processor 100 requests access to data stored in a designated magnetic tape cartridge stored in automated cartridge library system 113. Data processor 100 translates the request for this data into an operator console tape mount request message. Software, including tape cartridge library software 108, resides on data processor 100 and functions to interface the automated cartridge library system 113 in transparent fashion to data processor 100. This is accomplished by tape cartridge library software 108 which traps operator console messages from data processor 100 and converts these console messages into magnetic tape cartridge retrieval commands that are transmitted to the automated cartridge library system 113. Tape cartridge library software 108 contains a database that translates between the tape mount request operator console messages from data processor 100 and the exact physical location of the requested magnetic tape cartridge. Tape cartridge library software 108 transmits control signals to identify the exact location of the requested magnetic tape cartridge and the exact location of the destination tape drive. The robot arm in automated cartridge library system 113 is controlled by a control unit which translates the control signals into servo control signals to regulate the operation of the various servo systems of the robot arm to retrieve the requested magnetic tape cartridge from its tape cartridge storage cell. The magnetic tape cartridge so retrieved by the robot arm is then placed by the robot arm in a tape drive where it can be read by data processor 100.

Disk Drive Array

Disk drive array 112 emulates the operation of a large form factor disk drive by using a plurality of interconnected small form factor disk drives. These small form factor disk drives are configured into redundancy groups, each of which contains n+m disk drives for storing data records and redundancy information thereon. Each redundancy group, also called a logical disk drive, is divided into a number of logical cylinders, each containing i logical tracks, one logical track for each of the i physical tracks contained in a cylinder of one physical disk drive. Each logical track is comprised of n+m physical tracks, one physical track from each disk drive in the redundancy group. The n+m disk drives are used to store n data segments, one on each of n physical tracks per logical track, and to store m redundancy segments, one on each of m physical tracks per logical track in the redundancy group. The n+m disk drives in a redundancy group have unsynchronized spindles and loosely coupled actuators. The data is transferred to the disk drives via independent reads and writes since all disk drives operate independently.

The disk drive array data storage subsystem 112 is a dynamically mapped system, and virtual devices are defined in the storage control unit contained therein. Each virtual device is the image of a disk drive presented to data processor 100 over the channel interface. A virtual device is an entity addressable by data processor 100 with host-controlled content and host-managed space allocation. In this system, the virtual device consists of a mapping of a large form factor disk drive image onto a plurality of small form factor disk drives which constitute at least one redundancy group within the disk drive array. The virtual to physical mapping is accomplished by the use of a Virtual Device Table (VDT) entry which represents the virtual device. The "realization" of the virtual device is the set of Virtual Track Directory (VTD) entries, associated with the VDT entry each of which VTD entries contains data indicative of the Virtual Track Instances, which are the physical storage locations in the disk drive array redundancy group that contain the data records. The data storage management functions are performed in a manner that renders the operation of the disk drive array data storage subsystem 112 transparent to data processor 100.

Existing Media Management Elements

The data processor 100 should designate, for each data set that is created, an appropriate data storage device or media type which is appropriate for the type of usage of this data set. This is typically accomplished in an MVS environment in the form of data set allocation by the Storage Management Subsystem (SMS) 121, which is a component of the MVS/DFP system 120. The storage management subsystem 121 is used to automate and centralize the management of data set storage by providing the storage administrator with control of data class (DATACLAS), storage class (STORCLAS), management class (MGMTCLAS), storage group (STORGRP), aggregate group and automatic class selection (ACS) routine definitions. The data class is a list of the data set allocation attributes that the data processor 100 uses when allocating a new data set, while storage class is a list of storage performance and availability service requests. Management class is a list of data set migration, backup, and retention attributes used to manage storage at the data set level. Storage group is a list of real DASD volumes or volumes no longer on the data processor 100 but still referred to in user programs. The storage management subsystem 121 can include a data facility storage management subsystem (DFSMS) which manages volumes and data sets in an MVS environment, as well as data facility data set services (DFDSS) which copies, moves, dumps and restores DASD data sets and volumes, as well as the data facility hierarchical storage manager (DFHSM) 133 which backs up, recovers and manages space on DASD volumes in a storage device hierarchy. Collectively, these subsystems are typically used to manage space on DASD devices as well as associated tape storage systems but are unable to totally accomplish the assigned task since data set naming standards are not consistently followed and the data facility storage management subsystem can therefore not make informed decisions regarding data set allocation.

The media management system 101 operates in conjunction with the storage management subsystem 121 to dynamically determine the proper allocation of a data set to a particular type of media that is connected to the data processor 100. The media management system 101 accomplishes this by making use of a plurality of system catalogs 131 that are resident in the MVS/DFP system 120 as well as newly created ones in order to determine the eligibility of a data set to be written on tape media based upon the data set size, off-site requirements and available DASD space. This determination takes place in real time and eligible data sets are intercepted and allocated to DASD rather than tape. Similarly, when data is no longer in use by the customer's application program, the data facility hierarchical storage manager 133 migrates the data set directly to managed tape contained in automated cartridge library system 113 where it expires according to customer defined criteria. While DASD and tape are the two media allocations described in detail herein, it is obvious that the concepts described herein are applicable to multiple other types of media. This media management apparatus 101 allows a user to introduce new media types into the data storage hierarchy, since this represents simply another class or level in the hierarchy and the same management concepts apply thereto.

Media Allocation Overview

In operation, when the data processor 100 creates a new generation data set, the media management system 101 performs a real time interrogation of the system catalogs 131, the tape library system catalogs 132, the data facility hierarchical storage manager catalog 133 and the free space list 134 for the DASD devices to evaluate the appropriate media for this new data set. If the data set does not meet the eligibility requirements due to insufficient DASD space to hold the data set, it is directed to magnetic tape. However, if the data set is eligible for interception and storage on the DASD devices (111 or 112), the media management system 101 instructs the data facility hierarchical storage manager 133 to allocate the data set to a DASD buffer pool 111. A similar evaluation takes place when the data processor 100 recalls a data set from tape. In this situation, the media management system 101 checks the size of the data set and frequency of its usage and, as a result of this check, the data set may be directed to a DASD buffer pool 111 or to a permanent data DASD pool 112 if it is determined that this data set is more cost effectively used when resident on DASD.

Figure 3A:
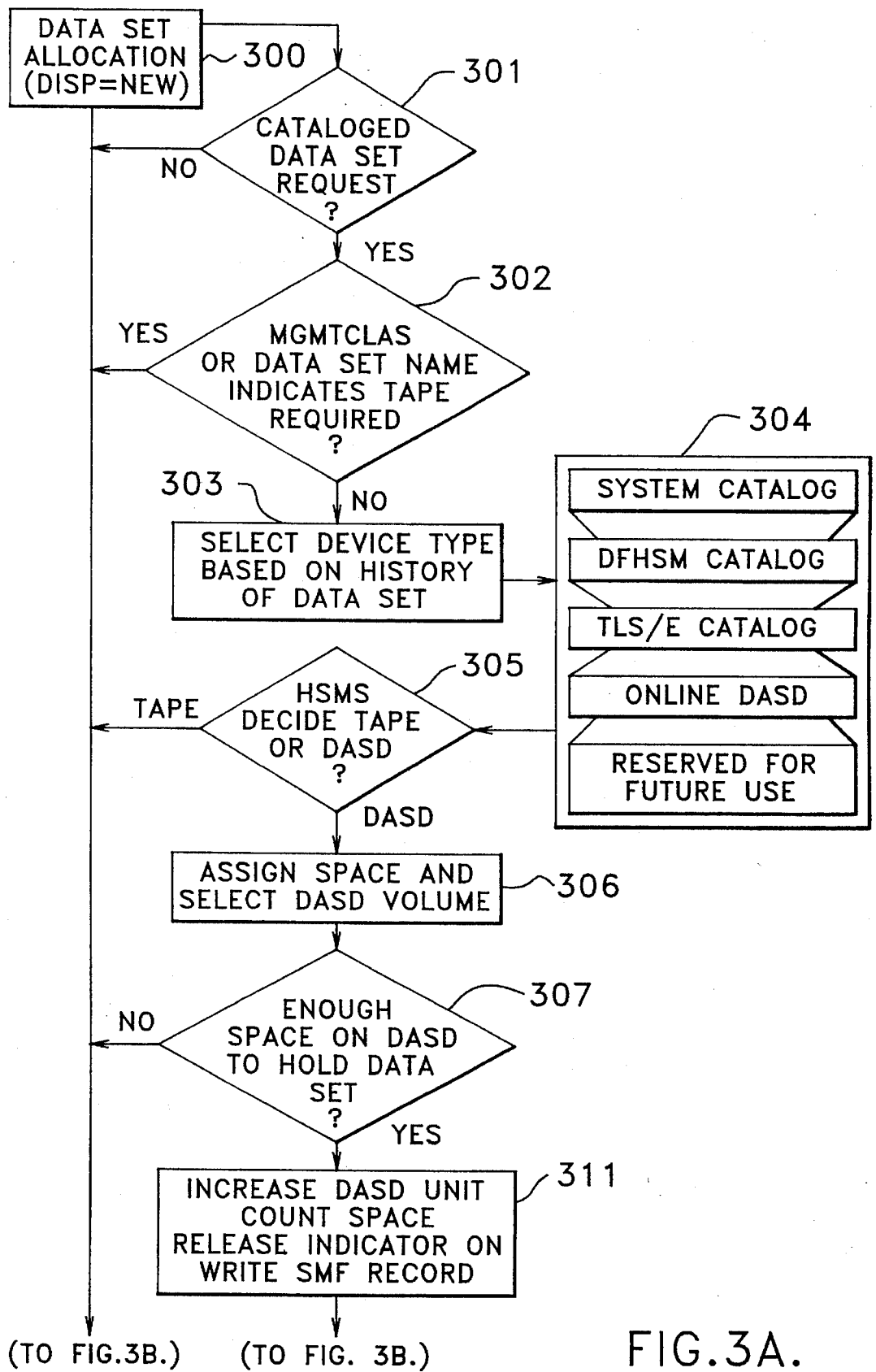
FIGS. 3A–3B illustrate in flow diagram form the overall steps taken to manage the allocation of newly created tape data sets.
Figure 3B:
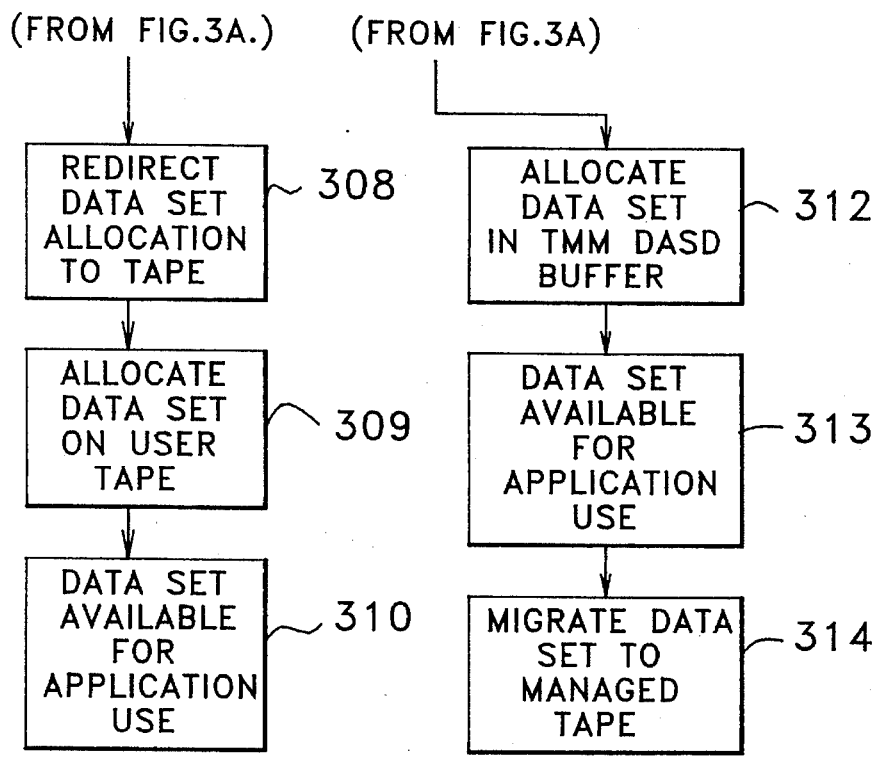

To illustrate the concepts of this invention a description of an allocation of a new tape data set is used as a specific example. FIG. 3 illustrates in flow diagram form details of the overall steps taken by the media management system 101 for allocating new tape data sets. When a new data set is allocated by the data processor 100, the request is reviewed at step 301 by the storage management system 121 to determine whether the request is a cataloged data set request. If not, processing advances at step 308 to redirect the data set allocation at step 309 to tape where space is allocated for this particular data set on a designated user tape. The data in the data set is written at step 310 onto this tape when it is mounted on an appropriate tape drive and the data set is then available for use by an application program that can run on the data processor 100. If however the data set allocation was a cataloged data set request, processing advances to step 302 to determine whether the management class or the data set name indicates that a magnetic tape is required. If either of these indicates that magnetic tape is required, processing proceeds to step 308 to redirect the data set allocation to tape as described above. If there is no indication that magnetic tape is required for this data set, processing advances to step 303 where the media management system 101 selects the device type based on the history of the data set. This is accomplished by reviewing the various system catalogs 131 at step 304 as described in further detail below. As a result of this analysis of the history of the data set, the media management system 101 determines at step 305 whether this data set is to be stored on tape or DASD. If tape is designated, processing advances to step 308 to redirect the data set allocation to tape. If not, the storage management system 121 at step 306 assigns space for this data set and selects the particular DASD volume on which the new data set is to be stored. At step 307, a determination is made whether there is sufficient space on the DASD to hold this new data set. If not, processing of the DASD allocation is terminated and the data set is redirected at step 308 for allocation to magnetic tape. If the DASD does have sufficient space to hold the data set under the criteria used by the media management system 101, processing advances to step 311 where the media management system 101 increases the DASD unit count, writes the system management function record and then at step 312 allocates the data set in the DASD buffer pool 111. The data set is then available at step 313 for use by an application program and, depending on the usage activity of the data set can eventually be migrated at step 314 to managed tape at a later time.

As can be seen by this overall flow diagram, the allocation of a data set to a particular type of media is a function of a number of different criteria and the decision is made on a dynamic basis as the data set is created by the data processor 100. In managing the data sets on the various storage media in this system, historical data is available from related data sets previously created and managed as a generation data group. By dynamically managing the data sets that are created by the data processor 100 and stored on the data storage system, the use of mountable storage media can be maximized, while at the same time the manual intervention to store and retrieve data minimized. The management criteria can also be changed during the life cycle of the data set to reflect changes in the data storage system or the needs of the users of the data processor 100.

Media Management System Details

The media management system 101 consists of a plurality of software routines illustrated in FIG. 2 resident on data processor 100. The media management system 101 receives requests from the resident control software 202, which for the purpose of this invention is IBM's Storage Management Subsystem (SMS) Automatic Class Selection (ACS) Routines. Automatic Class Selection routines 202 are a procedural set of automatic class selection language statements. These statements are based on a set of input variables and generate the name of a predefined SMS class or a list of names of predefined storage groups for both data sets and objects. The Automatic Class Selection Routine 202 transmits a subsystem call (211) in response to the need of a user to create or access a data set on the data storage subsystem. The Automatic Class Selection Routine 202 creates a subsystem call parameter list to pass to the media management system 101. This request block is illustrated in FIG. 14 and contains information required for the media management system 101 to perform space calculations and to make an intelligent decision regarding the storage residency of a particular data set. The parameter list presented to the media management system 101 consists of two parts: a space request and a migration history request. The typical IBM designations for the data provided in these fields are listed in FIG. 14 and the following table denotes the meaning of these various acronyms:

HSMSSBID—Block ID—c'HSMS'
HSMSSBSP—File size return word
HSMSSBDS—Data set name
HSMSSBJB—Job name
HSMSSBDD—DD name
HSMSSBAC—Access code
HSMS2ERO—Address of IBM SMS ACERO control block
HSMS2ERW—Address of IBM SMS ACERW control block
HSMS2RET—Address to return MGMTCLAS As can be seen from the parameter list, the information passed by the Automatic Class Selection Routine 202 to the media management system 101 consists of data to identify the particular data set and its size to the media management system 101 as well as information indicating the location of relevant control data and an address in which to place data identifying the management class for this particular data set once it is determined by the media management system 101. The media management system 101 executes in the user address space 201 to repackage the information received from the automatic class selection routine 202 as well as additional information gathered from the user's address space 201 to create the request block illustrated in FIG. 15. Again, the contents of the request block are illustrated acronymically and a translation of those acronyms are provided in the following list:

HSMSUNXT—Next request pointer
HSMSUECB—Event control block to post user's ASID
HSMSUADR—Address of user's ASCB
HSMSUSTT—User status word/work areas
HSMSUST2—User status word/work areas
HSMSUST3—User status word/work areas
HSMSMIGR—DFHSM Migrate date returned
HSMSDSN—Data set name
HSMSUJOB—Job name
HSMSUDDN—DD name
HSMSUACC—User's access code
HSMSUSPC—Data set size returned
HSMSSDAT—Date of subsystem call
HSMSSTIM—Time of subsystem call
HSMSSFLG—DFHSM flags returned The media management system 101 then transmits (212) the control block illustrated in FIG. 16 to the media management system address space 203 where it is added to a chain of requests for media management processing. A flag is created in the user address space 201 to indicate the presence of a block in the media management system address space 203 that needs to be processed by use of the MVS post system service that identifies this particular request block. When outstanding requests are queued in the media management address space 203, the media management system 101 retrieves and processes each request in the timewise order received. Each request is contained in the single control block illustrated in FIG. 15, and the requests are chained together for simplicity of retrieval.

Request Block Processing

Figure 4A:
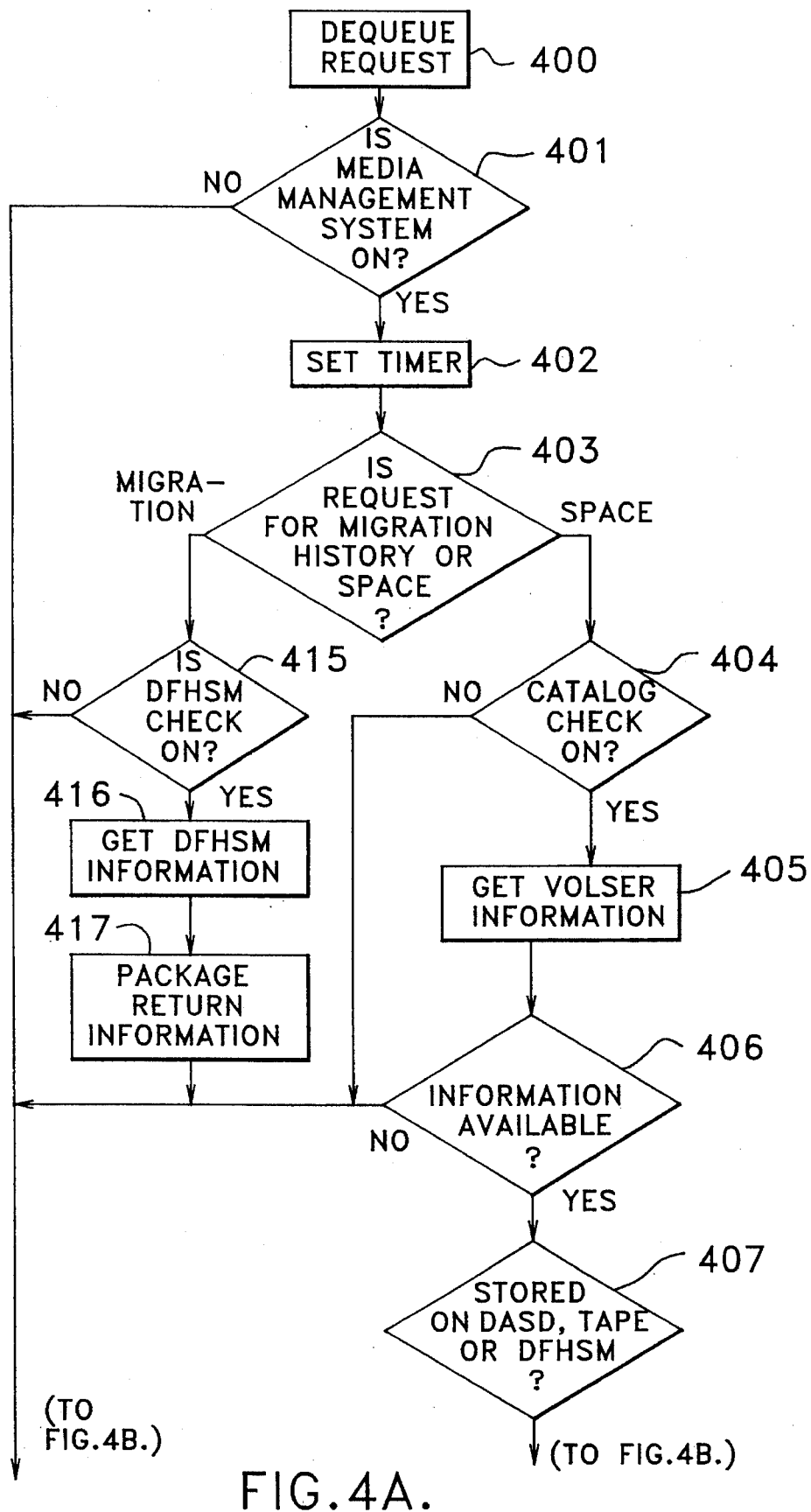
FIGS. 4A–4B illustrate in flow diagram form the processing of a media management request.
Figure 4B:
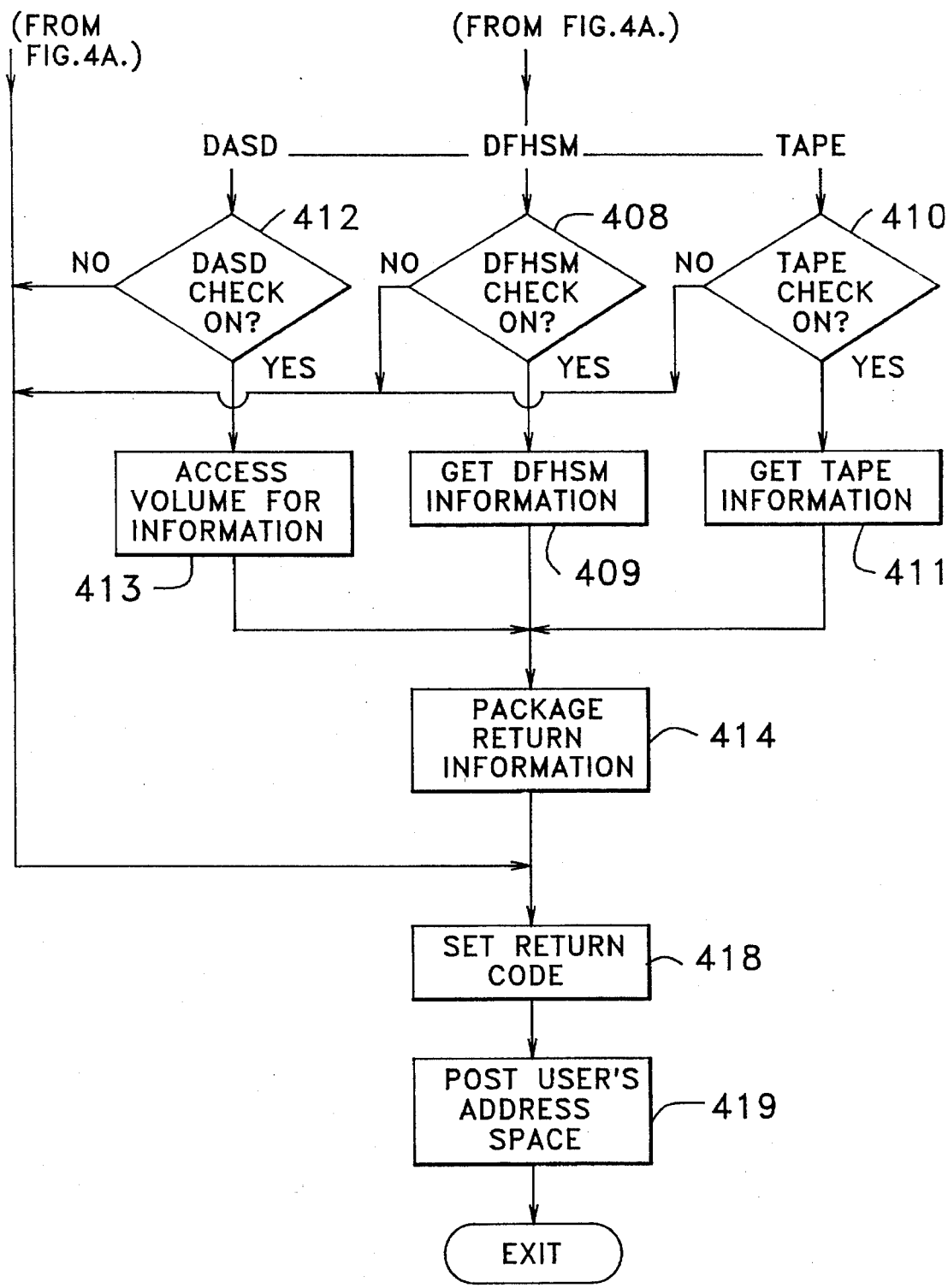

FIG. 4 illustrates in flow diagram form the general processing of a request block that is stored in the media management system address space 203. The result of a request being processed is that data set historical information (size, migration history, etc.) is returned (213) to the user's address space in the request block originally passed to the media management system 101. These entries consist of the migration history returned, data set size returned and DFHSM flags returned as well as any other additional information that may be relevant to the processing of this request block. The media management system 101 again uses the MVS post system to indicate the presence of a response request block in the user address space 201. The media management system 101 returns the information contained in the response request block to the automatic class selection exit subroutine 202 that initially made the subsystem request.

At step 400, the media management system 101 dequeues the request block from the chain of requests in media management system address space 203 and at step 401 determines whether media management system processing should continue as defined by the HSMSOFF bit contained in the HSMSFLG1 block of control parameters that are illustrated in FIG. 13. The control parameters illustrated in FIG. 13 consist of a table of control values that are stored by the media management system 101 to indicate the various system statuses and operational parameters that are relevant to managing the media. These parameters are discussed in detail below as they are used by the media management system 101 in the processing of a request. Suffice it to say that the blocks illustrated in FIG. 13 represent the necessary control parameters to maintain the operation of the media management system 101:

- HSMSFLG1—HSMS Flag byte #1
  - 80—HSMSTLSE—Tape check on/off
  - 40—HSMSHSM—DFHSM check on/off
  - 20—HSMSVTOC—DADSM check on/off
  - 10—HSMSCAS—Catalog check on/off
  - 04—HSMSTEST—Emulation mode on/off
  - 01—HSMSOFF—HSMS subsystem on/off
- HSMSFLG2—HSMS Flag byte #2
  - 80—HSMSDCEX—DATACLAS exit on/off
  - 40—HSMSMCEX—MGMTCLAS exit on/off
  - 20—HSMSSCEX—STORCLAS exit on/off
  - 10—HSMSMSG1—Error messages on/off
- HSMSSMFR—SMS record id number
- HSMSPTR—Pointer to additional values
- HSMSSPAC—Available DASD space required for each data set
- HSMSMAXS—Maximum data set size eligible for redirection to DASD
- HSMSSGRP—HSMS Storage group name
- HSMSMGMT—HSMS Management class name
- HSMSDATA—HSMS Data class name
- HSMSSTOR—HSMS Storage class name
- HSMSTIME—Default timeout value
- HSMSPCAT—Address of HSMS routine
- HSMSPHSM—Address of HSMS routine
- HSMSPTLS—Address of HSMS routine
- HSMSPSPC—Address of HSMS routine If the HSMSOFF bit is set in the off state, then the media management system 101 is not presently operational and processing advances to step 418 where a return code is created to indicate to the automated class selection routines 202 that media management is not operational. At step 419, the media management system 101 uses the MVS post facility to set a flag in the user's address space 201 indicative of the presence of a response request message for the automated class selection subroutine 202. If at step 401 it is determined that the media management system 101 is active, processing advances to step 402 where a timer is initiated to ensure that processing of the request does not take an excessive amount of time in the various processing areas. If the time limit of the timer is exceeded, then processing of the request is aborted and control is returned to the Automated Class Selection Routine 202 at step 418 as noted above. The request block is then checked by the media management 101 at step 403 to determine whether a migration history has been requested by the automated class selection routine 202 or a definition of the data set space has been requested. If at step 403 it is determined that a definition of the data set space is required, the media management system 101 at step 404 performs a check of the HSMSCAS bit in the control blocks illustrated in FIG. 13 to determine whether the catalog check capability is enabled. If not, processing advances to step 418 and the return code is sent as described above. If catalog checking is active, the media management system 101 retrieves information regarding the data set residency at step 405 while obtaining the volume serial number information (VOLSER) from the catalogs 131 maintained by the data processing system 110 in memory. At step 406, if the information requested is not available, processing advances to step 418 and a return code is generated as described above. If the volume serial number information is available, then at step 407 the media management system 101 determines whether the requested data set is stored on DASD 111, manually managed tape 114, alternative disk 112 or an automated cartridge library system 113. Depending on whether the data set is identified as being on DASD 111, 112, tape 113 or managed tape 114, at steps 412, 410, 408, respectively, the media management system 101 checks the control block illustrated in FIG. 13 to determine whether the corresponding media class is presently active. If not, processing advances to step 418 and a return code is generated as described above. If the check bit is enabled, then the media management system 101 proceeds to obtain data concerning the extent of the data set in the VTOC for the DASD at step 413 or the tape catalog at step 411 for automated library tape and managed tape at step 409 if the data set is stored on a managed tape cartridge. At step 414, the media management system 101 packages this information as illustrated in FIG. 16 into a response block which is written into the user address space 201. At step 418 the media management system 101 sets a return code as described above.

Alternatively, if at step 403 the media management system 101 determines that migration history information concerning this data set was to be retrieved, processing advances to step 415 where the HSMSHSM status bit as illustrated in FIG. 13 is set to indicate that the DFHSM calls are active. If not, processing advances to step 418 as noted above. If so, the migration history information is received at step 416 from the catalogs maintained by DFHSM. This information at step 417 is packaged by the media management system 101 into a response block as illustrated in FIG. 15 and written to the user's address space 201. The return code is then set at step 418 and the Automated Class Selection Routine 202 is notified via the MVS post system at step 419 and processing then terminates on this request.

Administrative Functions

Figure 5:
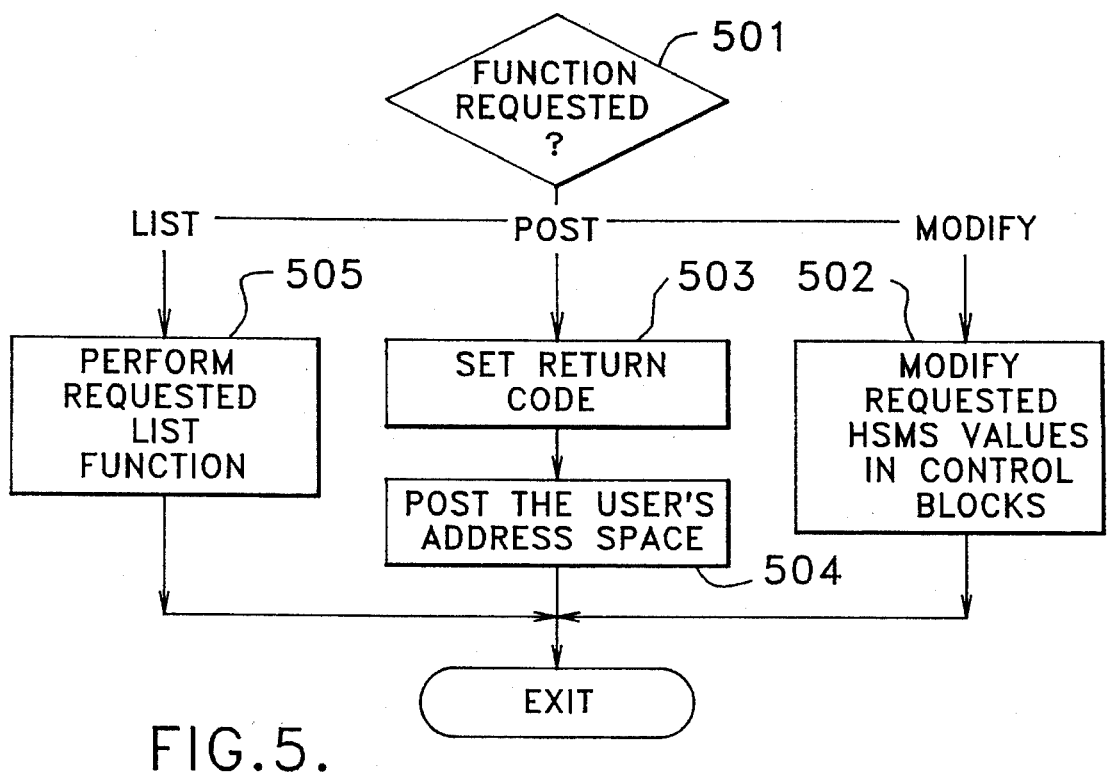
FIG. 5 illustrates in flow diagram form the processing of various administrative functions.
Figure 6A:
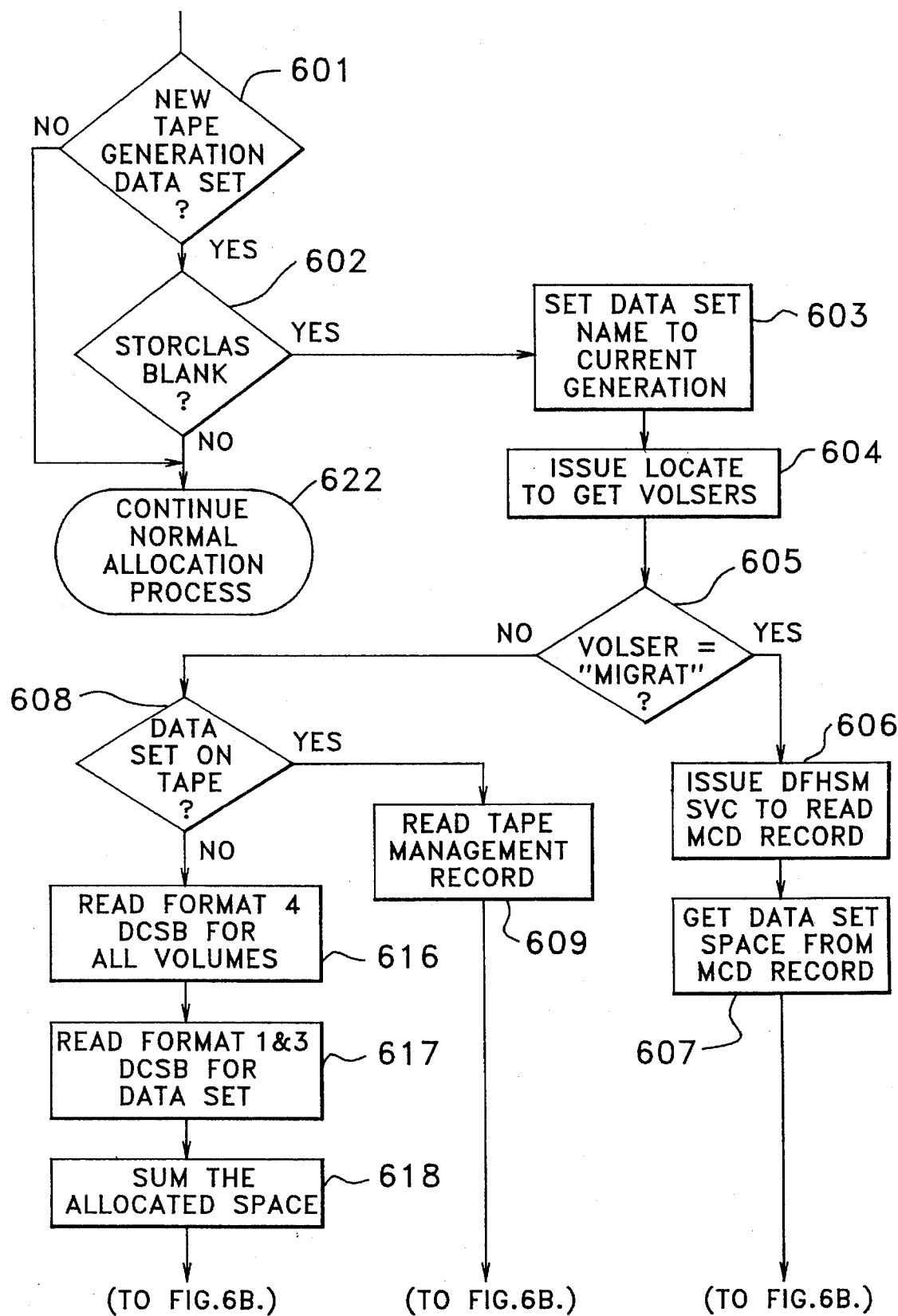
FIGS. 6A–6B illustrate in flow diagram form additional detail of the logic followed for the creation of a new tape generation data set.
Figure 6B:
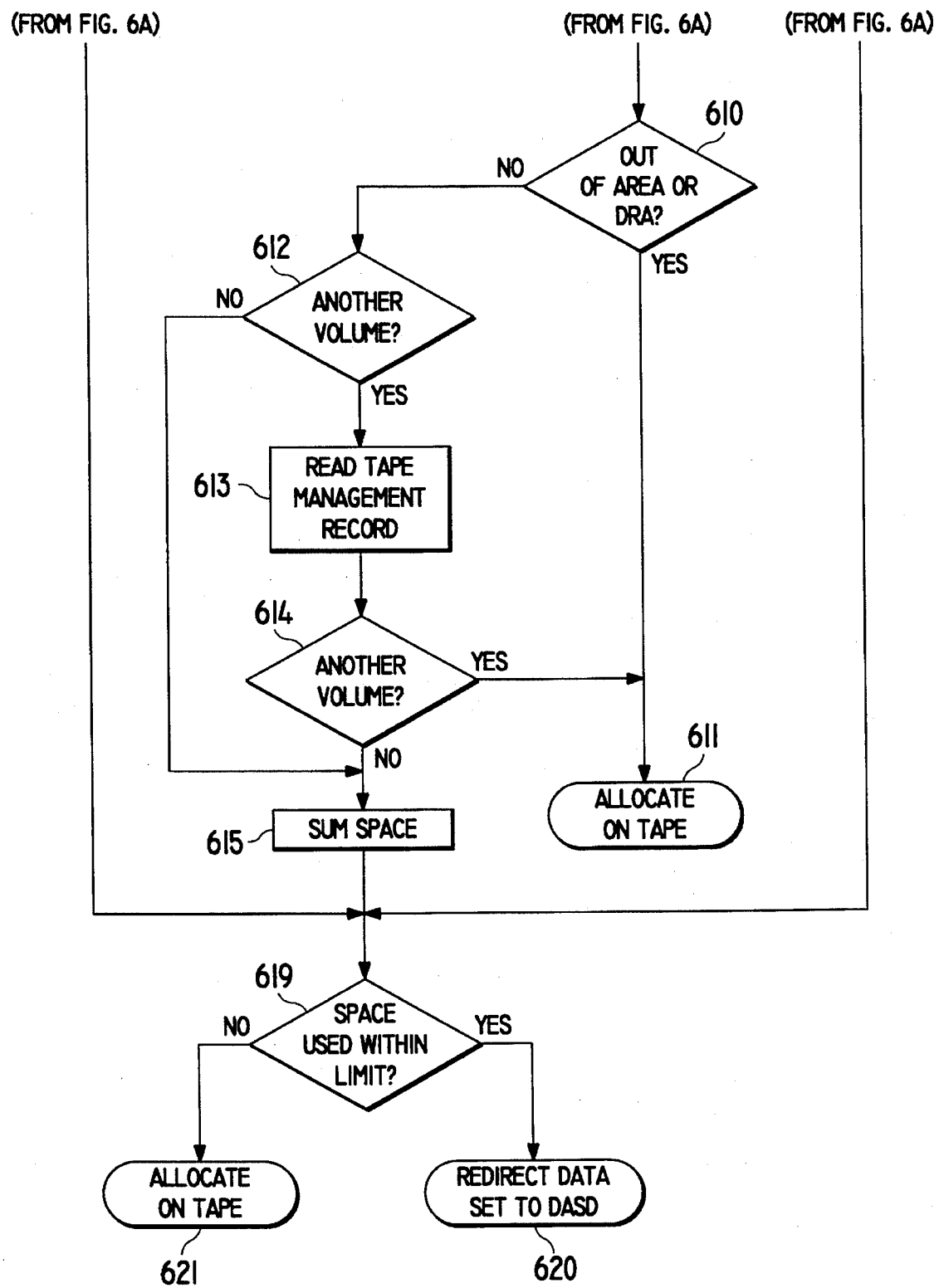

There are a number of administrative functions that can be performed cooperatively between the automated class selection function 202 and the media management system 101. FIG. 5 illustrates in flow diagram form the operation of some of these simple procedures. At step 501, the system management software 120 forwards an operative command to the media management system 101 requesting one of three functions: list, post, modify. If a list function is requested, at step 505 the media management system 101 retrieves the information requested by the operator and transmits this information back to the MVS system for display on the operator's console. Processing then exits once the requested information is completely displayed. This information can be a display of current control values that are illustrated in FIG. 13 or a list of the address spaces cataloged by job name presently awaiting processing by the media management system 101. If a post command was received by the media management system 101, at step 503 a return code is set and at step 504 the media management system 101 flags the user's address space that has been identified in the request that was received from the system management software 120. Processing then exits once this flag has been set in the user address space 201. If a modify command was received by the system management software, at step 502 the media management system 101 modifies the identified control values in the control blocks illustrated in FIG. 13 as identified in the operator command that was received by the media management system 101. The following list indicates some of the dynamic control parameters in addition to the control blocks that can be modified by the user or the data processor 100:

- ON/OFF—Activates/deactivates all HSMS Subsystem function
- TEST/NOTEST—Places HSMS in emulation or active mode
- MSG/NOMSG—Turns on/off error message display
- CASCHK/NOCASCHK—Activate/deactivate ICF catalog interface
- DFHSMCHK/NODFHSMCHK—Activates/deactivates DFHSM interface
- TLSECHK/NOTLSECHK—Activates/deactivates TLSE interface
- VTOCCHK/NOVTOCCHK—Activates/deactivates DADSM interface
- DCEXIT/NODCEXIT—Activates/deactivates DATACLAS exit (FIG. 4)
- MCEXIT/NOMCEXIT—Activates/deactivates MGMTCLAS exit (FIG. 7)
- SCEXIT/NOSCEXIT—Activates/deactivates STORCLAS exit (FIG. 6)
- DCRESET/NODCRESET—Activates/deactivates reset of data sets (FIG. 4)
- DATACLAS=Specifies first six characters of HSMS DATACLAS
- MGMTCLAS=Specifies first six characters of HSMS MGMTCLAS
- STORCLAS=Specifies first six characters of HSMS STORCLAS
- STORGRP=Specifies HSMS storage group name
- TIMEOUT=Specifies time limit in seconds for HSMS execution
- SMFID=Specifies SMF record ID for logging HSMS activity
- RESERVE=Specifies amount of space that must be available at allocation time for each data set
- MAXSIZE=Specifies maximum size of data set that can be redirected from tape to DASD Determine Media Type FIG. 6 illustrates in flow diagram form the operational steps taken by the media management system 101 when a new data set is to be created on a storage device. This flow diagram illustrates the process steps taken by the media management system 101 to determine whether this data set should be created on tape or DASD or some other subclass or other media. For the sake of simplicity, FIG. 6 has been presented as making a determination whether to allocate this data set on DASD or on tape. It is obvious that finer granularity of decision can be incorporated by additional selection steps and other types of media can be incorporated into this decision tree process. This process is initiated by the storage management system software data class automatic class selection exit routine 202. Control of this process is transferred to the media management system 101 when a data set needs to be created on a storage device. The resident code in the storage management subsystem 121 detects the request for a new data set and exits to the media management system 101. At step 611, the media management system 101 determines whether the new data set being created is a new tape generation data set. If not, processing exits from this subroutine at step 632 and data sets that are being recalled or recovered from a data set archival system are described herein below. FIG. 6 illustrates simply the creation of a new tape generation data set. At step 602, the media management system 101 determines from the request block that is transmitted by the Automatic Class Selection Routine 202 whether a storage class has previously been assigned by the storage management subsystem 121 to this particular data set. If it has, then no further processing is done at this time since the data processor 100 has overridden the media management system 101 automated class selection capability by previously assigning a storage class to this data set. A storage class (STORCLAS) is a named list of hardware capabilities and performance requirements that are assigned to a particular data set. If the data processor 100 has previously specified these particular parameters for this data set, then the operation of the media management system 101 is unnecessary since reallocation of this particular data set to override the data processor's designation is an undesirable procedure. Therefore, processing would exit at step 622 and control returns to the MVS system.

However, if no storage class has been assigned to this data set, at step 603 a data set name is provided for this new data set. Since this is a generation data set, its name is the same as the previous data sets created in this generation data group. All the generation data sets in a generation data group have a generation number assigned to them to indicate the timewise order of creation of this particular data set within this group of data sets. The generation data set prior to the one that is presently being created provides the historical data necessary to determine the most efficient storage media for this new generation data set. Therefore, by using the data set name of the previous data sets contained in this generation group, a uniform ordering of the generation data sets within this generation data group can be maintained.

The assigned data set name is simply updated to reflect the most current existing data set in this generation data group at step 603. This new data set name is the one that is used during the remainder of the processing depicted in this flow diagram of FIG. 6. At step 604, the media management system 101 accesses the system and user catalogs 131 that are maintained in the memory of the data processor 100 to determine the physical location of the current generation of this particular data set. This access is typically through the IBM Multiple Virtual Storage/Data Facility Produce (MVS/DFP) Locate System Service. The media management system 101 makes use of this existing locate service to retrieve the volume serial numbers (VOLSER) and the unit type of the present storage device on which the present generation of this data set is now stored. At step 605, the media management system 101 determines whether the VOLSER for this data set is "MIGRAT" which indicates that the data set is presently migrated to a backend archive data storage pool under control of an archive system such as IBM's Data Facility Hierarchical Storage Manager (DFHSM) 133. If so, the media management system 101 transmits control messages to the archive storage system 133 at step 606 to request that data concerning the migration history and size of this data set be returned to the media management system 101 in order to determine the media on which this data set is to be created. The media management system 101 transmits control messages to the archive 113 facility via the data processor 100 to obtain a migration control data set (MCD) record that is illustrated in FIG. 10. This migration control data set record contains information regarding the size and migration history and name of this particular data set. At step 617, the media management system 101 obtains the data set size from this migration control data set record and processing advances to step 619 to determine whether the size of the data set is below a predetermined threshold. This threshold is used to differentiate between data sets that can be redirected to DASD and those that must be allocated on tape because their size is of too great an extent to be stored on DASD. Therefore, if this data set extent is below the predetermined threshold, at step 619 then processing advances to step 620 and the media management system 101 redirects the data set to a DASD device for access to the data processor 100. If the data set size is above the predetermined threshold, then at step 621 the media management system 101 allocates this data set on tape media to most efficiently make use of the DASD devices for smaller data sets.

If, at step 605, the VOLSER did not indicate that this was an archived data set, then at step 608 the media management system 101 checks the unit type assigned to this data set as identified in the catalog information obtained via the locate service on the data processor 101 from the user catalogs to determine whether the data set presently resides on tape 113, 114 or on DASD 111, 112. At step 608, if the data set does not reside on tape then at step 616 the format 1 data set control block (DSCB) for this data set is read for all volumes identified by the locate service as including this data set. For each volume so identified, at step 617, the media management system 101 reads the format 1 and format 3 data set control blocks to retrieve the size information for this particular data set. Examples of a typical data set control block are illustrated in FIG. 11 and these are standard elements that are found in a typical IBM processing system. In particular, a format 1 data set control block is the identifier data set control block that defines the characteristics and up to three extents of a data set. Additional extents are described in a format 3 data set control block pointed to by the format 1 data set control block. At step 618, the media management system 101 sums the data set extents for all of the volumes that were identified at step 604. The total of all of these data set extents represents the full extent of this data set and processing advances to step 619 where the computed data set extent is compared with the predetermined threshold as noted above.

At step 608, if the data set is presently allocated to tape, then processing advances to step 609 where the tape management system 132 is accessed to return information on this particular identified tape volume(s). If the volume is marked out of area as determined at step 610, or noted as disaster recovery volume, then the data set is not a candidate for redirection to DASD and must be allocated to tape via exit step 611. In these identified situations, redirecting the data set to DASD would defeat the very purpose of designating the volume out of area or disaster recovery. At step 612, the media management system 101 determines whether the data set spans a second volume. If not, processing advances to step 615. If the data set does span a second volume, then processing advances to step 613 and the tape management system 132 is again accessed for information on this particular volume. If the data set spans yet a third volume, it is not a candidate for relocation to DASD and it is allocated to tape by exiting at step 611. It is obvious that the three volume threshold identified in this flow diagram is a matter of design choice and the number of volumes that a data set can span before it is allocated to tape can vary. In the particular embodiment three volumes is the breakpoint and, if the data set does not span three volumes, at step 615, the data set is a candidate for redirection to DASD and its size in bytes is calculated by multiplying the data set block size (BLKSIZE) by the number of blocks used in each of the volumes. The total of the computed extents of the data set represents the size of the data set and this value is used at step 619 to determine whether the size of this data set exceeds the predetermined threshold as noted above.

Data Set Allocation

Figure 7A:
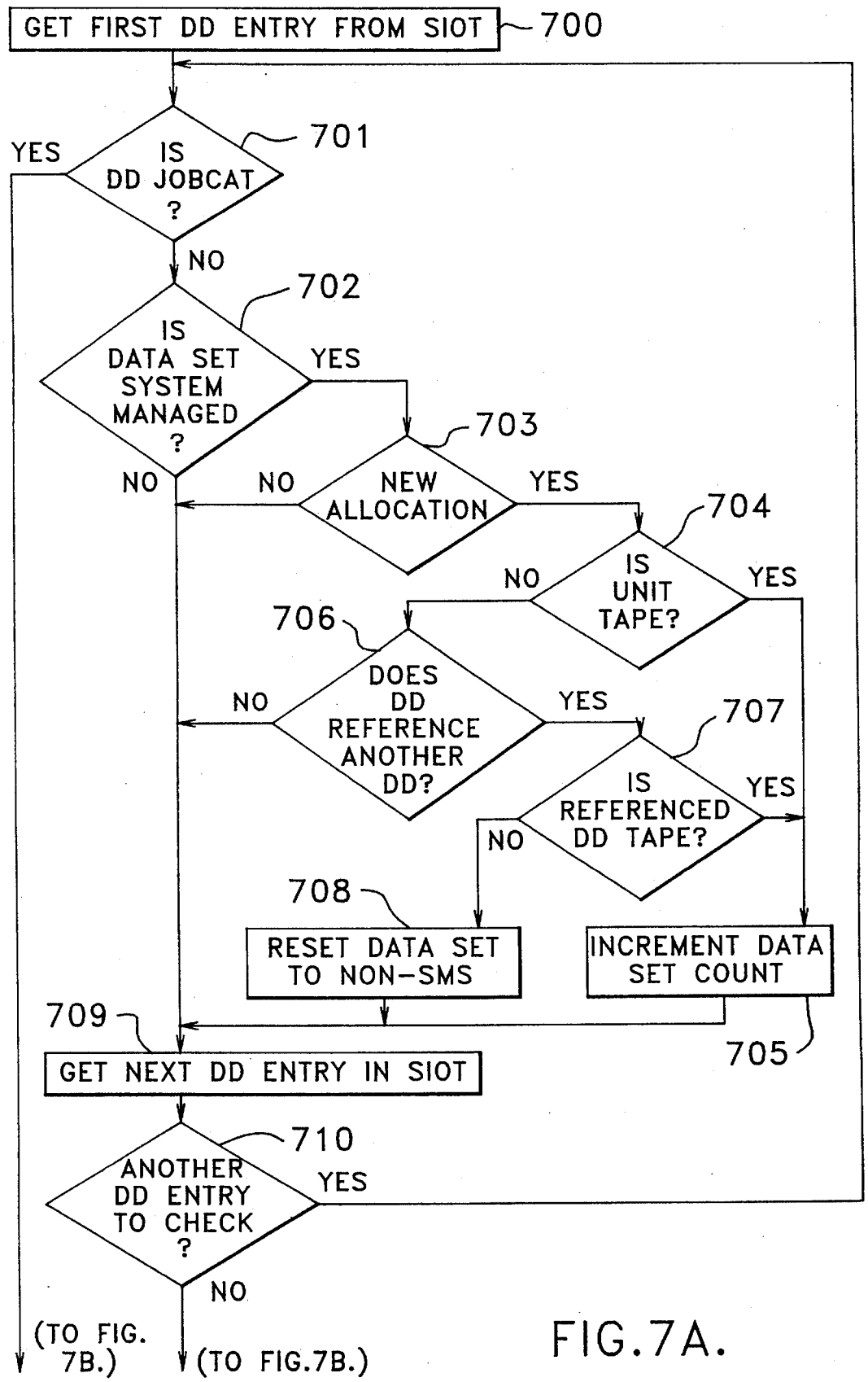
FIGS. 7A–7B illustrate in flow diagram form the steps executed at data set allocation time to determine the data set's ability to be redirected from tape to DASD.
Figure 7B:
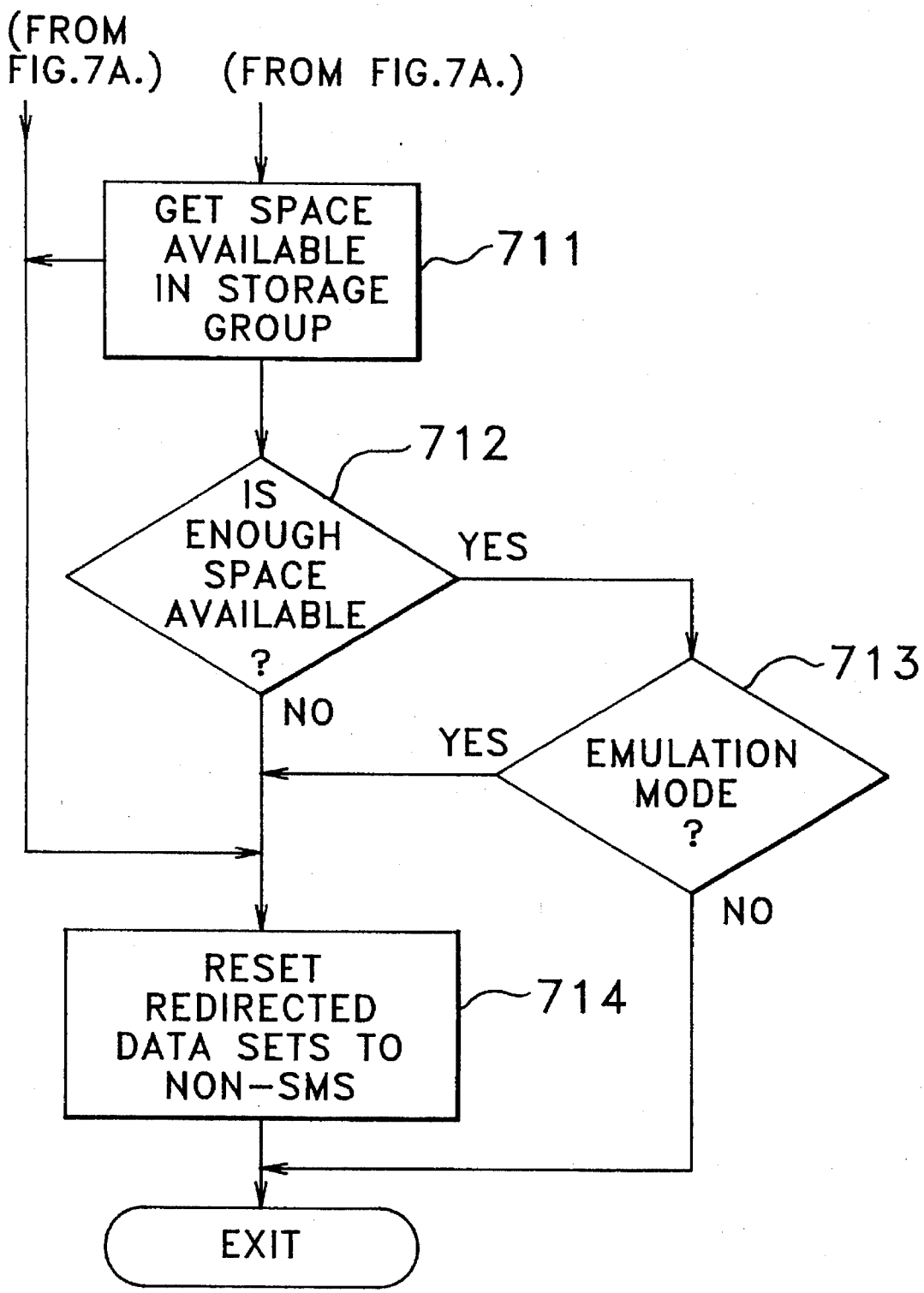

When a data set is redirected by the media management system 101 to DASD, a data class, a storage class and a management class are all assigned to this data set to indicate this redirection. The management class additionally indicates the data set can and should be migrated into an archive memory system, such as automated cartridge library system 113, during the next archive migration cycle. FIG. 7 illustrates in flow diagram form the operational steps taken by the media management system 101 to execute the data set allocation process. These operational steps taken by the media management system 101 obtain control of the allocation process during initialization and dynamic allocation and functions to manage the administrative data during the redirection of tape data sets to DASD. At step 700, the media management system 101 obtains the first data definition (DD) entry from the step input/output table (SIOT) of the MVS data areas. The step input/output table is an MVS control block that contains information pertaining to a data definition (DD) statement. The format of an entry in this table is illustrated in FIG. 12 and contains acronyms that are well known in the MVS processing environment will not be described in any detail herein. At step 701, if this retrieved entry is classified JOBCAT, then no data sets can be system managed and processing must exit at step 714 where the media management system 101 redirects the data set to tape. This redirection is accomplished by turning on the SIO3TAPE flag and turning off the SIOTSMSM flag for each new tape data set flagged as a candidate for redirection to DASD. In addition, the allocation work area (ALCWA) SMSREQS count is decremented by the data set count and the allocation work space PVTNREQS count is incremented by the same data set count. To complete the reset, the allocation work space is flagged to indicate that tape is to be allocated.

If, at step 701, the data dictionary entry is not JOBCAT, then processing advances to determine whether the data set is to be system managed at step 702. If the data set is not system managed or as determined at step 703 is not a new allocation, no further processing is performed and processing exits to step 709. However, if the data set is system managed and is a new allocation, at step 704 the media management system 101 determines whether tape media was originally requested for this particular data set. If so, the data set count is incremented by one at step 705 and processing advances to step 709. If tape media was not requested for this data set, at step 706, the data set is checked to see if it refers to another data dictionary entry in the step input/output table for allocation information. If the data set does not reference another entry, processing advances to step 709. If another entry was referenced, at step 707 the media management system 101 determines whether the referenced data set is on tape or not. If it is on tape, at step 705 the data set count is incremented and processing advances to step 709. If the referenced data set is not tape, processing advances to step 708 where the present data set is reset for allocation to tape. The data set reset is accomplished by turning on the SIO3TAPE flag and turning off the SIOTSMSM flag in the step input/output table illustrated in FIG. 12. Next, the ALCWA SMSREQS count is decremented by 1 and the ALCWA PVTNREQS count is incremented by 1. To complete the reset, the ALCWA is flagged to indicate that tape media is to be allocated to this data set. Processing proceeds at step 709 where the media management system 101 obtains the next DD entry from this step input/output table. If one exists, at step 710, processing returns to step 701 and the routine is repeated until there are no more entries in the step input/output table to be retrieved by the media management system 101. After all DD entries have been checked, the storage management system 121 is called at step 711 to retrieve the current available space in the storage group. A storage group is a logically related set of storage volumes. The data set count as incremented at step 705 is multiplied by the media management system 101 reserve space value as designated in the entry (HSMSSPAC) in the parameter table of FIG. 13. This value is compared to the available space in the storage group at step 712 to determine whether sufficient space is available to store the data set. If sufficient space is not available processing proceeds to step 714 as described above. If sufficient space is available at step 713 the media management system 101 determines whether the media management system 101 is running in an emulation mode. If it is, all the data sets are redirected for allocation to tape at step 714. If not, the procedure ends and exits.

Recall or Recovery of Data Set

Figure 8:
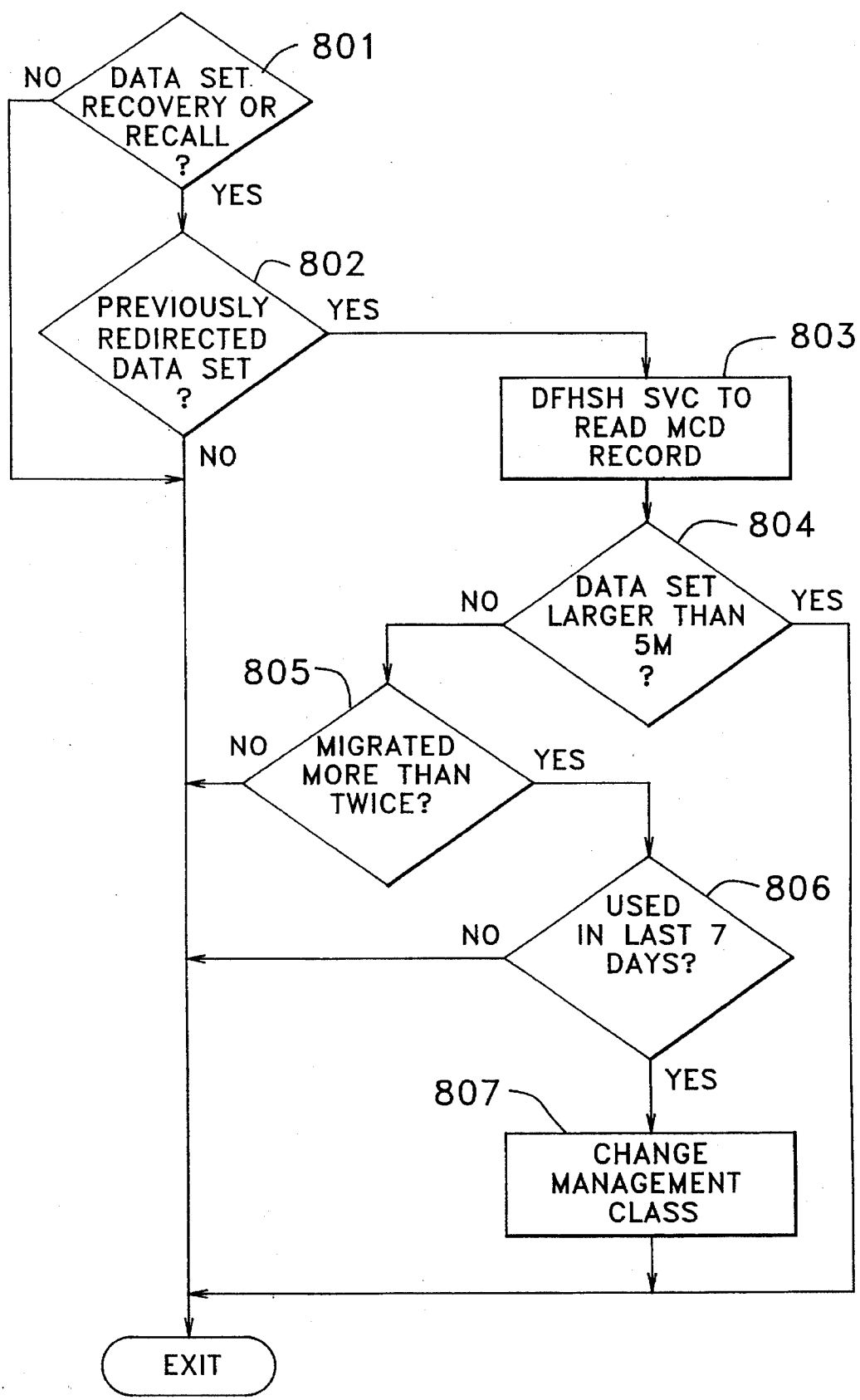
FIG. 8 illustrates in flow diagram form the operational steps taken to recall or recover a data set.

FIG. 8 illustrates in flow diagram form the processing performed by the media management system 101 when allocating a data set which is being recalled or recovered from the archive memory, such as automated cartridge library system 113. Control for this process is received by the media management system 101 at storage management system storage class automatic class selection exit time. At step 801, the media management system 101 reviews the control signals received from the SMS system 121 to determine whether the data set is being recovered or recalled. If not, processing aborts and the process exits. If it is a recovery or recall data set at step 802 a determination is made whether the data set was previously redirected from tape to DASD. If the data set was not previously redirected from tape to DASD, no further is processing is done at this time and the process exits. The data set storage class is checked to determine if this redirection was done. If the data set was previously redirected, a call is made to the archive storage system catalogs 133 at step 803 to obtain a migration control data set record as illustrated in FIG. 10. This record contains information regarding the size and migration history of this data set. At step 804, the media management system 101 determines whether the size of this data set is larger than a predetermined size, such as 5 megabytes. If it is larger than 5 megabytes, no further processing is performed and the data set continues to be managed in the same manner. If the data set size is less than the predetermined threshold and has not been migrated more than twice as determined at step 805, then at step 806 the media management system 101 determines whether the data set was used within a predetermined period of time, such as the last seven days. If the data set has been migrated more than twice and less than seven days has elapsed since its last use, then the media management system 101 indicates a new management criteria for this data set at step 807. This indication is made by changing the data set's management class and recalling the data set to DASD for an extended period of time. Processing then exits.

Management class selection

Figure 9A:
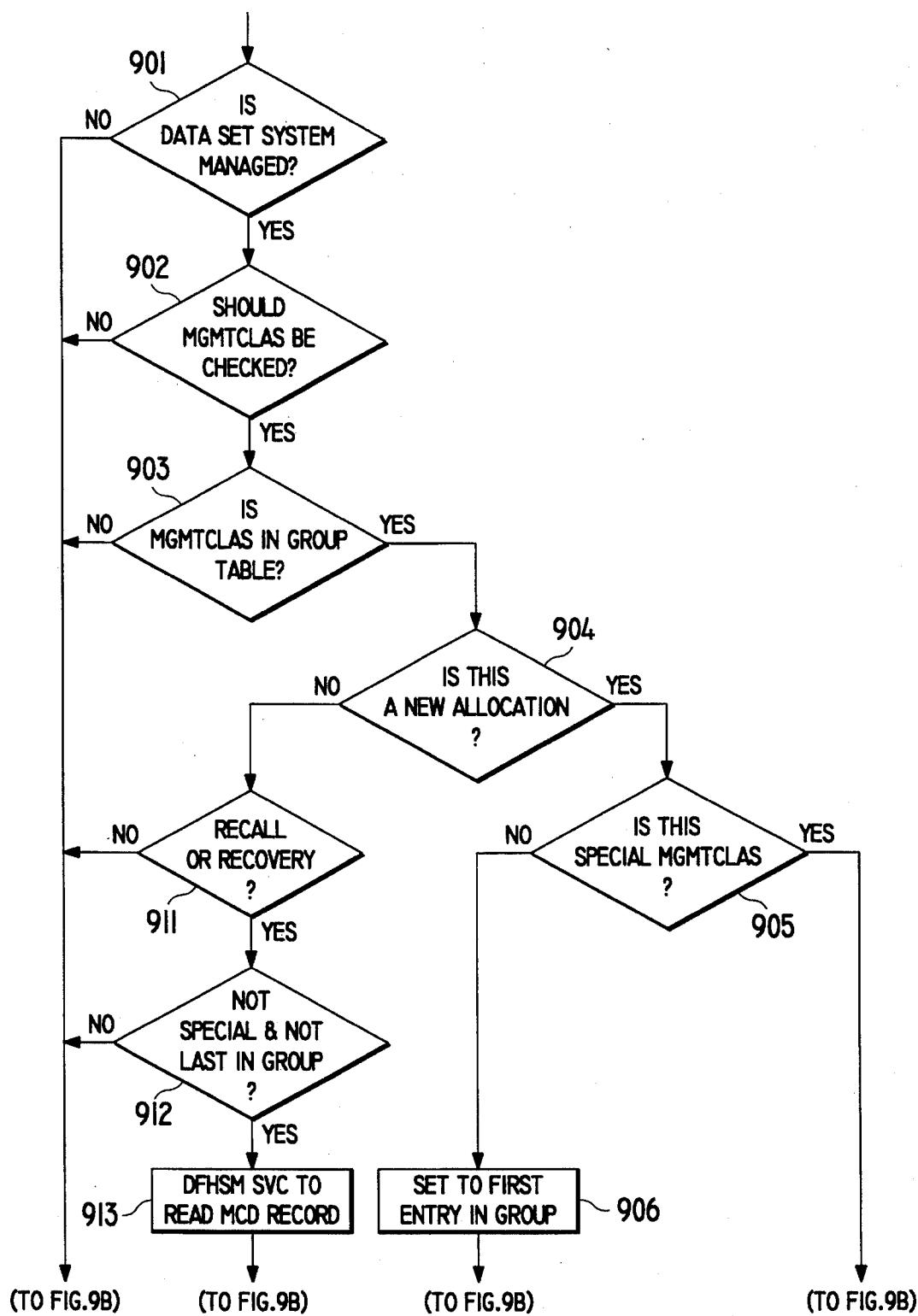
FIGS. 9A–9B illustrate in flow diagram form the steps executed to dynamically determine the appropriate management class to be assigned to a data set.
Figure 9B:
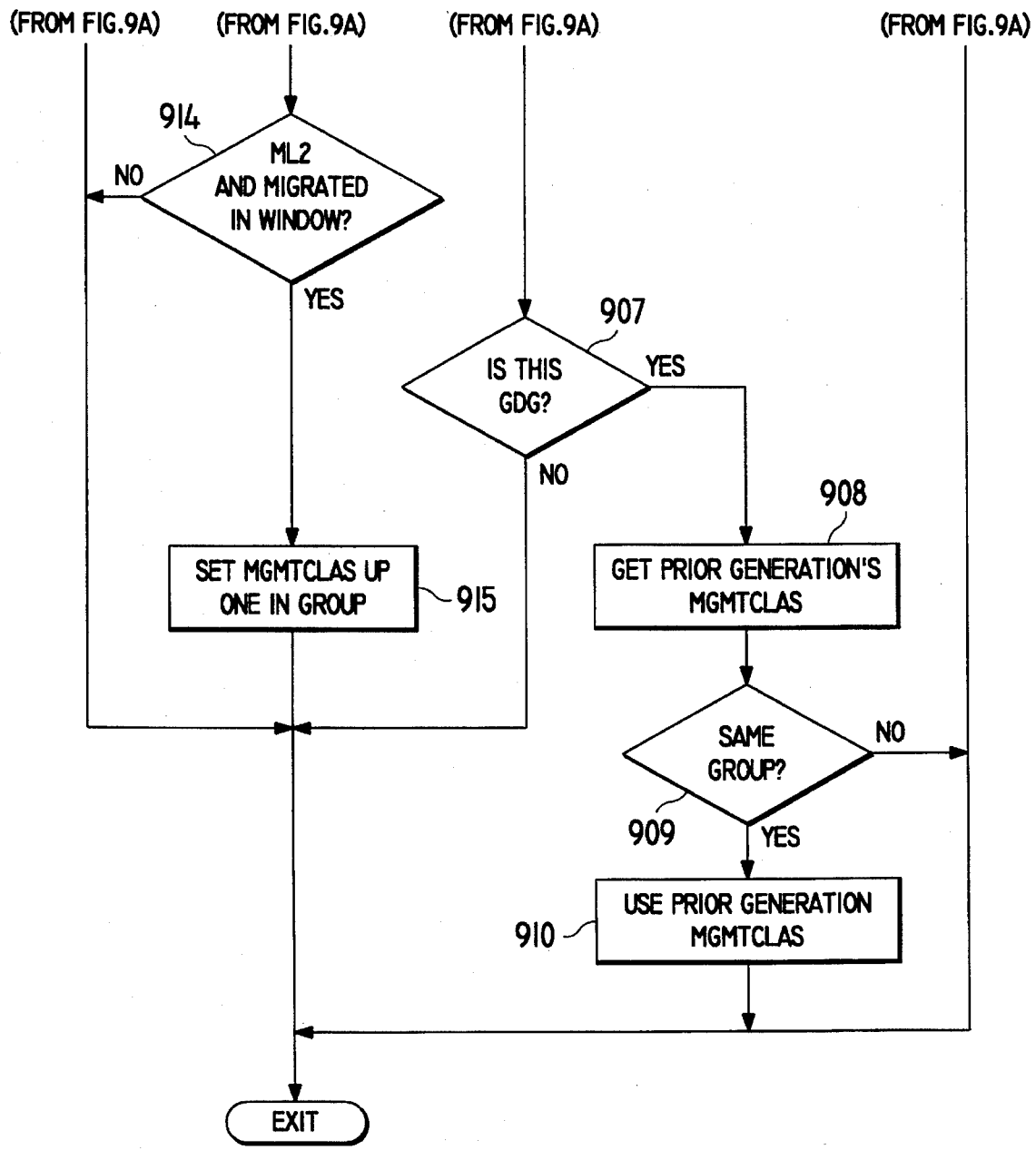

FIG. 9 illustrates in flow diagram form the overall steps taken by the media management system 101 when the storage management system 121 automatic class selection routine 202 reaches management class exit time. When a data set is to be created on a storage device, the media management system 101 determines at step 901 whether the data set being created is to be system managed. If not, processing exits. If a system managed data set is being created, the management class is checked at step 902 to determine whether it is a dynamic management class (numerics in position 5 and 6). If so the management class group table is checked at step 903. This group table is illustrated in FIG. 15 and the acronyms displayed therein are defined in the following table:

GRPID—Built from positions 2, 5, and 6 of MGMT-CLAS name

GRPADDR—Points to first table entry containing GRPID match

CLASSNAM—Actual MGMTCLAS name

CLSMIGF—Migration flags from the MGMTCLAS

CLSPRDY—Number of days data set should remain on LO DASD

CLSL1DY—Number of days data set should remain on ML1

MLSCMAU—Command/auto-migrate byte from MGMTCLAS

At step 903, the media management system 101 reviews the entries in the management class group table to confirm this data set's management class is contained in the table. If the table does not contain a match no further processing is done at this time. If the management class is identified as being contained in the group table, then at step 904 the media management system 101 determines whether a new data set is being allocated. If the data set is not new and is being recalled or recovered as determined at step 911, the existing management class is compared with the last group entry at step 912 with the last group entry being indicated in FIG. 15. If the management class is the last entry in the group or one that indicates special processing as determined at step 912, then no further processing is done at this time. Otherwise, the archive storage system 133 is called to retrieve historical migration information about this data set at step 913. This is accomplished by transmitting a control message to the archive memory system to obtain a migration control data set record as illustrated in FIG. 10 to indicate the size and migration history of this data set. If the data set resides in the migration level 2 (ML2) pool and has migrated there within a predetermined time frame as determined at step 914, the data set is assigned the next management class in the group at step 915. This management class change is used by future generations of the data set as they are created. Processing then exits.

At step 904, if a new data set is being allocated, at step 905 the management class is checked for special processing, such as the management class containing "00" in position 7 and 8. If the special management class is requested by the data processor, no further processing is done at this time. The remaining new data sets have the management class set to the first entry in the group at step 906. If the data set is a generation data set as determined at step 907, the prior generation's management class is retrieved by the media management system 101 at 908 via the MVS/DFP IGWASMS system service. If this new management class is within the same group as determined at step 909, it is assigned to the new generation data set being created at step 910. Processing then exits.

These flow diagrams illustrate some of the factors that can be used to manage media in a multiple media data storage system. As other media are introduced and variations in the data storage system architecture implemented, the above described media management system must be adapted to account for these variations. Therefore, while a specific embodiment of this invention has been disclosed, it is expected that those skilled in the art can and will design alternate embodiments of this invention that fall within the scope of the appended claims.

I claim:

1. A media management apparatus for use with a data processor that processes data stored in data sets, comprising:

a plurality of data storage devices, connected to said data processor, for storing data sets for said data processor, said plurality of data storage devices being divided into at least two classes of data storage devices, each said class of data storage devices differing from others of said at least two classes of data storage devices in data storage characteristics;

means, responsive to said data processor generating commands to access an identified data set, for receiving said commands;

means for selecting, based on historical data of said identified data set and independent of said data processor, a one of said at least two classes of data storage devices to store said identified data set, wherein said historical data includes data set size of a last most recently created generation of said identified data set; and means for transmitting data to said data processor indicative of said selected one class of data storage devices for said data processor to store said identified data set thereon.

2. The apparatus of claim 1 wherein said identified data set is a new data set of an existing generation data set, said selecting means comprises:

means for identifying a location on said at least two classes of data storage devices that stores a last most recently created data set of said existing generation data set;

means for retrieving data set activity data relating to said last most recently created generation data set stored in said identified location; and means for comparing said activity data to at least one predetermined threshold to identify a one class of data storage devices to store said new generation data set.

3. The apparatus of claim 2 wherein said comparing means comprises:

means for computing an extent of said last most recently created generation data set; and means for comparing said extent to a predetermined data set size threshold to select said one class of data storage devices to store said new generation data set.

4. The apparatus of claim 2 wherein said comparing means comprises:

means for collecting data that identifies a migration history of said last most recently created generation data set; and means for comparing said migration history to at least one predetermined threshold to identify said one class of data storage devices to store said new generation data set.

5. The apparatus of claim 2 wherein said comparing means comprises:

means for collecting data that identifies usage of said last most recently created generation data set; and means for comparing said usage data to at least one predetermined threshold to identify said one class of data storage devices to store said new generation data set.

6. The apparatus of claim 1 wherein said selecting means comprises:

means, responsive to said data processor retrieving an existing data set from an identified one of said plurality of data storage devices, for determining whether said retrieved data set should be written back to said identified one data storage device.

7. The apparatus of claim 6 wherein said selecting means further comprises:

means for identifying a one of said plurality of data storage devices, different in data storage characteristics from said identified one data storage device, to store said retrieved data set when said determining means indicates that said retrieved data set should not be written back to said identified one data storage device.

8. The apparatus of claim 1 wherein said receiving means comprises:

means, responsive to said data processor designating said one of said plurality of classes of data storage devices to store said identified data set, for disabling said selecting means.

9. The apparatus of claim 1 wherein said at least two classes of data storage devices comprise:

a plurality of tape drives, connected to said data processor, for reading/writing data sets for said data processor on mountable tape media; and at least one rotating media data storage subsystem, connected to said data processor, for reading/writing data sets for said data processor on rotating data storage media.

10. The apparatus of claim 1 wherein said at least two classes of data storage devices comprise:

an automatic mountable tape media handling system, connected to said data processor, for robotically storing and retrieving a plurality of mountable tape media for a plurality of tape drives that are connected to said data processor, to read/write data sets for said data processor on selected ones of said mountable tape media that are mounted by said automatic mountable tape media handling system in said plurality of tape drives; and at least one rotating media data storage subsystem, connected to said data processor, for reading/writing data sets for said data processor on rotating data storage media.

11. The media management apparatus of claim 1, wherein said means for selecting also includes means for accessing a system catalog to obtain said historical data of said identified data set.

12. A method of managing media for use with a data processor that processes data stored in data sets on a plurality of data storage devices connected to said data processor, said plurality of data storage devices being divided into at least two classes of data storage devices, each said class of data storage devices differing from others of said at least two classes of data storage devices in data storage characteristics, said method comprising the steps of:

receiving, in response to said data processor generating commands to access an identified data set, said commands;

selecting, based on historical data of said identified data set and independent of said data processor, a one of said at least two classes of data storage devices to store said identified data set, wherein said historical data includes data set size of a last most recently created generation of said identified data set; and transmitting data to said data processor indicative of said selected one class of data storage devices for said data processor to store said identified data set thereon.

13. The method of claim 12 wherein said identified data set is a new data set of an existing generation data set, said step of selecting comprises:

identifying a location on said at least two classes of data storage devices that stores a last most recently created data set of said existing generation data set;

retrieving data set activity data relating to said last most recently created generation data set stored in said identified location; and comparing said activity data to at least one predetermined threshold to identify a one class of data storage devices to store said new generation data set.

14. The method of claim 13 wherein said step of comparing comprises:

computing an extent of said last most recently created generation data set; and comparing said extent to a predetermined data set size threshold to select said one class of data storage devices to store said new generation data set.

15. The method of claim 13 wherein said step of comparing comprises:

collecting data that identifies a migration history of said last most recently created generation data set; and comparing said migration history to at least one predetermined threshold to identify said one class of data storage devices to store said new generation data set.

16. The method of claim 13 wherein said step of comparing comprises:

collecting data that identifies usage of said last most recently created generation data set; and comparing said usage data to at least one predetermined threshold to identify said one class of data storage devices to store said new generation data set.

17. The method of claim 12 wherein said step of selecting comprises:

determining, in response to said data processor retrieving an existing data set from an identified one of said plurality of data storage devices, whether said retrieved data set should be written back to said identified one data storage device.

18. The method of claim 17 wherein said step of selecting further comprises:

identifying a one of said plurality of data storage devices, different in data storage characteristics from said identified one data storage device, to store said retrieved data set when said determining means indicates that said retrieved data set should not be written back to said identified one data storage device.

19. The method of claim 12 wherein said step of receiving comprises:

disabling, in response to said data processor designating said one of said at least two classes of data storage devices to store said identified data set, said selecting means.

20. The method of managing media of claim 12, wherein said step of selecting further comprises a step of accessing a system catalog to obtain said historical data of said identified data set.

21. A media management apparatus for use with a data processor that processes data stored in data sets and maintains data in a memory that identifies a physical storage location of each said data sets, comprising:

a plurality of tape drives connected to said data processor, for reading/writing data sets for said data processor on mountable tape media;

at least one rotating media data storage subsystem, connected to said data processor, for reading/writing data sets for said data processor on rotating data storage media;

means, responsive to said data processor generating commands to access an identified data set, for receiving said commands;

means for selecting, based on historical data of said identified data set and independent of said data processor, a one of said plurality of tape drives and said rotating media data storage subsystem to store said identified data set, wherein said historical data includes data set size of a last most recently created generation of said identified data set; and means for transmitting data to said data processor indicative of said selected one of said plurality of tape drives and said rotating media data storage subsystem for said data processor to store said identified data set thereon.

22. The apparatus of claim 21 wherein said identified data set is a new data set for an existing tape generation data set, said selecting means comprises:

means for identifying a location on said mountable tape media that stores a last most recently created data set of said existing tape generation data set;

means for retrieving data set activity data from said memory relating to said last most recently created tape generation data set stored in said identified location; and means for comparing said activity data to at least one predetermined threshold to identify a one of said tape drives and said rotating media data storage subsystem to store said new generation data set.

23. The apparatus of claim 22 wherein said comparing means comprises:

means for computing an extent of said last most recently created tape generation data set; and means for comparing said extent to a predetermined data set size threshold to select said one of said tape drives and said rotating media data storage subsystem to store said new tape generation data set.

24. The apparatus of claim 22 wherein said comparing means comprises:

means for collecting data that identifies a migration history of said last most recently created tape generation data set; and means for comparing said migration history to at least one predetermined threshold to identify said one of said tape drives and said rotating media data storage subsystem to store said new tape generation data set.

25. The apparatus of claim 22 wherein said comparing means comprises:

means for collecting data that identifies usage of said last most recently created tape generation data set; and means for comparing said usage data to at least one predetermined threshold to identify said one of said tape drives and said rotating media data storage subsystem to store said new tape generation data set.

26. The apparatus of claim 21 wherein said selecting means comprises:

means, responsive to said data processor retrieving an existing data set from an identified one of said mountable tape media mounted on a one of said plurality of tape drives, for determining whether said retrieved data set should be written to said rotating media data storage subsystem.

27. The apparatus of claim 26 wherein said transmitting means comprises:

means for identifying said rotating media data storage subsystem to store said retrieved data set when said determining means indicates that said retrieved data set should not be written back to said identified mountable tape media.

28. The apparatus of claim 21 wherein said receiving means comprises:

means, responsive to said data processor designating said one of said plurality of tape drives and said rotating media data storage subsystem to store said identified data set, for disabling said selecting means.

29. A method of managing media for use with a data processor that processes data stored in data sets and maintains data in a memory that identifies a physical storage location of each said data sets as stored on a plurality of tape drives, connected to said data processor, for reading/writing data sets for said data processor on mountable tape media and at least one rotating media data storage subsystem, connected to said data processor, for reading/writing data sets for said data processor on rotating data storage media, comprising the steps of receiving, in response to said data processor generating commands to access an identified data set, said commands;

selecting, based on historical data of said identified data set and independent of said data processor, a one of said plurality of tape drives and said rotating media data storage subsystem to store said identified data set, wherein said historical data includes data set size of a last most recently created generation of said identified data set; and transmitting data to said data processor indicative of said selected one of said plurality of tape drives and said rotating media data storage subsystem for said data processor to store said identified data set thereon.

30. The method of claim 29 wherein said identified data set is a new data set for an existing tape generation data set, said selecting means comprises:

means for identifying a location on said mountable tape media that stores a last most recently created data set of said existing tape generation data set;

means for retrieving data set activity data from said memory relating to said last most recently created tape generation data set stored in said identified location; and means for comparing said activity data to at least one predetermined threshold to identify a one of said tape drives and said rotating media data storage subsystem to store said new generation data set.

31. The method of claim 30 wherein said step of comparing comprises:

collecting data that identifies usage of said last most recently created tape generation data set; and comparing said usage data to at least one predetermined threshold to identify said one of said tape drives and said rotating media data storage subsystem to store said new tape generation data set.

32. The method of claim 30 wherein said step of comparing comprises:

computing an extent of said last most recently created tape generation data set; and comparing said extent to a predetermined data set size threshold to select said one of said tape drives and said rotating media data storage subsystem to store said new tape generation data set.

33. The method of claim 30 wherein said step of comparing comprises:

collecting data that identifies a migration history of said last most recently created tape generation data set; and comparing said migration history to at least one predetermined threshold to identify said one of said tape drives and said rotating media data storage subsystem to store said new tape generation data set.

34. The method of claim 29 wherein said step of selecting comprises:

determining, in response to said data processor retrieving an existing data set from an identified one of said mountable tape media mounted on a one of said plurality of tape drives, whether said retrieved data set should be written to said rotating media data storage subsystem.

35. The method of claim 34 wherein said step of transmitting comprises:

identifying said rotating media data storage subsystem to store said retrieved data set when said step of determining indicates that said retrieved data set should not be written back to said identified mountable tape media.

36. The method of claim 29 wherein said step of receiving comprises:

disabling, in response to said data processor designating said one of said plurality of tape drives and said rotating media data storage subsystem to store said identified data set, said step of selecting.

* * * * *